US012314005B2

(12) United States Patent
Kawamura et al.

(10) Patent No.: US 12,314,005 B2
(45) Date of Patent: May 27, 2025

(54) TONER

(71) Applicant: CANON KABUSHIKI KAISHA, Tokyo (JP)

(72) Inventors: Masashi Kawamura, Kanagawa (JP); Akane Masumoto, Shizuoka (JP); Takayuki Toyoda, Shizuoka (JP); Kenji Ookubo, Shizuoka (JP); Taku Shimoda, Tokyo (JP); Yu Yoshida, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 689 days.

(21) Appl. No.: 17/502,876

(22) Filed: Oct. 15, 2021

(65) Prior Publication Data

US 2022/0128919 A1  Apr. 28, 2022

(30) Foreign Application Priority Data

Oct. 23, 2020  (JP) .................... 2020-178374

(51) Int. Cl.
*G03G 9/087* (2006.01)
*C08F 8/32* (2006.01)
*C08F 265/04* (2006.01)
*G03G 9/097* (2006.01)

(52) U.S. Cl.
CPC ........... *G03G 9/09775* (2013.01); *C08F 8/32* (2013.01); *C08F 265/04* (2013.01); *G03G 9/08711* (2013.01)

(58) Field of Classification Search
CPC .......... G03G 9/08773; G03G 9/08768; G03G 9/08735; G03G 9/08711
See application file for complete search history.

(56) References Cited

U.S. PATENT DOCUMENTS

| | | | |
|---|---|---|---|
| 4,876,169 A * | 10/1989 | Gruber | G03G 9/08773 430/109.4 |
| 4,954,404 A | 9/1990 | Inoue et al. | |
| 5,104,763 A | 4/1992 | Ong | |
| 5,401,601 A * | 3/1995 | Sacripante | G03G 9/08768 430/108.2 |
| 5,620,783 A | 4/1997 | Takeuchi et al. | |
| 5,639,583 A | 6/1997 | Takeuchi et al. | |
| 5,776,543 A | 7/1998 | Takeuchi et al. | |
| 6,777,153 B2 | 8/2004 | Yano et al. | |
| 6,808,907 B2 | 10/2004 | Honma et al. | |
| 6,908,721 B2 | 6/2005 | Kenmoku et al. | |
| 6,911,520 B2 | 6/2005 | Fukui et al. | |
| 7,045,321 B2 | 5/2006 | Imamura et al. | |
| 7,141,342 B2 | 11/2006 | Toyoda et al. | |
| 7,264,910 B2 | 9/2007 | Toyoda et al. | |
| 7,288,357 B2 | 10/2007 | Toyoda et al. | |
| 7,393,912 B2 | 7/2008 | Mihara et al. | |
| 7,399,568 B2 | 7/2008 | Fukui et al. | |
| 7,408,017 B2 | 8/2008 | Imamura et al. | |
| 7,452,960 B2 | 11/2008 | Yano et al. | |
| 7,510,813 B2 | 3/2009 | Yano et al. | |
| 7,638,194 B2 | 12/2009 | Fukui et al. | |
| 7,638,590 B2 | 12/2009 | Fukui et al. | |
| 7,682,765 B2 | 3/2010 | Sugawa et al. | |
| 7,795,363 B2 | 9/2010 | Fukui et al. | |
| 7,833,685 B2 | 11/2010 | Tanaka et al. | |
| 7,833,687 B2 | 11/2010 | Kato et al. | |
| 7,858,282 B2 | 12/2010 | Ayaki et al. | |
| 7,935,771 B2 | 5/2011 | Fukui et al. | |
| 8,067,136 B2 | 11/2011 | Yano et al. | |
| 8,093,342 B2 | 1/2012 | Minami et al. | |
| 8,110,329 B2 | 2/2012 | Tominaga et al. | |
| 8,178,271 B2 | 5/2012 | Fukui et al. | |
| 8,211,606 B2 | 7/2012 | Murai et al. | |
| 8,288,069 B2 | 10/2012 | Fujikawa et al. | |
| 8,323,726 B2 | 12/2012 | Naka et al. | |
| 8,372,573 B2 | 2/2013 | Ayaki et al. | |
| 8,377,616 B2 | 2/2013 | Tani et al. | |
| 8,383,312 B2 | 2/2013 | Fujimoto et al. | |
| 8,383,313 B2 | 2/2013 | Ayaki et al. | |
| 8,551,680 B2 | 10/2013 | Ayaki et al. | |
| 8,574,801 B2 | 11/2013 | Itabashi et al. | |
| 8,603,712 B2 | 12/2013 | Aoki et al. | |
| 8,609,312 B2 | 12/2013 | Itabashi et al. | |
| 8,628,899 B2 | 1/2014 | Kawamura et al. | |

(Continued)

FOREIGN PATENT DOCUMENTS

| | | |
|---|---|---|
| CN | 107367912 A | 11/2017 |
| CN | 110083025 A | 8/2019 |

(Continued)

OTHER PUBLICATIONS

Translation of JP 2016-011973.*
Tadatomi Nishikubo, "Addition Reaction of Epoxy Compounds with Esters and Its Application for Polymer Syntheses", Journal of Synthetic Organic Chemistry, Japan, vol. 49, No. 3, p. 218-233, 1991.
U.S. Appl. No. 17/466,306, filed Sep. 3, 2021, Kenichi Nakayama.
U.S. Appl. No. 17/502,742, filed Oct. 15, 2021, Yu Yoshida.

(Continued)

*Primary Examiner* — Peter L Vajda

(74) *Attorney, Agent, or Firm* — VENABLE LLP

(57) ABSTRACT

A toner comprising a toner particle, wherein the toner particle comprises a binder resin, a resin A, and a resin B, the resin A comprises a substituted or unsubstituted silyl group in a molecule, a substituent of the substituted silyl group is at least one selected from the group consisting of an alkyl group having 1 or more carbon atoms, an alkoxy group having 1 or more carbon atoms, a hydroxy group, a halogen atom, and an aryl group having 6 or more carbon atoms, and the resin B comprises an azo group in a molecule.

11 Claims, No Drawings

(56) References Cited

U.S. PATENT DOCUMENTS

| | | |
|---|---|---|
| 8,652,725 B2 | 2/2014 | Watanabe et al. |
| 8,697,327 B2 | 4/2014 | Shibata et al. |
| 8,741,519 B2 | 6/2014 | Watanabe et al. |
| 8,785,101 B2 | 7/2014 | Kaya et al. |
| 8,815,484 B2 | 8/2014 | Tanaka et al. |
| 8,828,633 B2 | 9/2014 | Itabashi et al. |
| 8,846,284 B2 | 9/2014 | Kinumatsu et al. |
| 8,916,319 B2 | 12/2014 | Ikeda et al. |
| 8,940,467 B2 | 1/2015 | Hashimoto et al. |
| 8,986,914 B2 | 3/2015 | Fujikawa et al. |
| 9,029,056 B2 | 5/2015 | Kenmoku et al. |
| 9,034,549 B2 | 5/2015 | Shiotari et al. |
| 9,098,002 B2 | 8/2015 | Kenmoku et al. |
| 9,098,003 B2 | 8/2015 | Masumoto et al. |
| 9,146,485 B2 | 9/2015 | Tani et al. |
| 9,158,216 B2 | 10/2015 | Shimano et al. |
| 9,229,345 B2 | 1/2016 | Ikeda et al. |
| 9,256,148 B2 | 2/2016 | Fujikawa et al. |
| 9,261,806 B2 | 2/2016 | Moribe et al. |
| 9,285,697 B2 | 3/2016 | Fukudome et al. |
| 9,309,349 B2 | 4/2016 | Watanabe et al. |
| 9,377,705 B2 | 6/2016 | Shimano et al. |
| 9,383,668 B2 | 7/2016 | Noji et al. |
| 9,423,708 B2 | 8/2016 | Tominaga et al. |
| 9,423,714 B2 | 8/2016 | Kenmoku et al. |
| 9,429,860 B2 | 8/2016 | Kinumatsu et al. |
| 9,556,290 B2 | 1/2017 | Nishiura et al. |
| 9,575,424 B2 | 2/2017 | Nakagawa et al. |
| 9,594,323 B2 | 3/2017 | Fujikawa et al. |
| 9,599,919 B2 | 3/2017 | Isono et al. |
| 9,625,844 B2 | 4/2017 | Kaya et al. |
| 9,658,554 B2 | 5/2017 | Kinumatsu et al. |
| 9,715,187 B2 | 7/2017 | Mukumoto et al. |
| 9,720,340 B2 | 8/2017 | Tominaga et al. |
| 9,733,583 B2 | 8/2017 | Kuroki et al. |
| 9,733,584 B2 | 8/2017 | Masumoto et al. |
| 9,785,068 B2 | 10/2017 | Umeda et al. |
| 9,785,071 B2 | 10/2017 | Shimano et al. |
| 9,785,077 B2 | 10/2017 | Abe et al. |
| 9,798,256 B2 | 10/2017 | Kosaki et al. |
| 9,798,262 B2 | 10/2017 | Toyoizumi et al. |
| 9,811,016 B2 | 11/2017 | Aoki et al. |
| 9,823,595 B2 | 11/2017 | Toyoizumi et al. |
| 9,829,814 B2 | 11/2017 | Yoshida et al. |
| 9,829,816 B2 | 11/2017 | Tanaka et al. |
| 9,829,820 B2 | 11/2017 | Masumoto et al. |
| 9,835,964 B2 | 12/2017 | Yoshida et al. |
| 9,857,711 B2 | 1/2018 | Yoshida et al. |
| 9,857,713 B2 | 1/2018 | Kosaki et al. |
| 9,864,290 B2 | 1/2018 | Yamawaki et al. |
| 9,869,943 B2 | 1/2018 | Aoki et al. |
| 9,880,478 B2 | 1/2018 | Shimano et al. |
| 9,897,932 B2 | 2/2018 | Hotta et al. |
| 9,897,933 B2 | 2/2018 | Yoshida et al. |
| 9,921,501 B2 | 3/2018 | Mochizuki et al. |
| 9,964,879 B2 | 5/2018 | Terui et al. |
| 9,996,018 B2 | 6/2018 | Kubo |
| 10,012,922 B2 | 7/2018 | Yoshida et al. |
| 10,054,866 B2 | 8/2018 | Tanaka et al. |
| 10,078,285 B2 | 9/2018 | Kubo et al. |
| 10,114,303 B2 | 10/2018 | Katsura et al. |
| 10,295,920 B2 | 5/2019 | Nishikawa et al. |
| 10,295,922 B2 | 5/2019 | Terui et al. |
| 10,303,074 B2 | 5/2019 | Yamawaki et al. |
| 10,303,075 B2 | 5/2019 | Tanaka et al. |
| 10,409,180 B2 | 9/2019 | Koji et al. |
| 10,416,582 B2 | 9/2019 | Nakagawa et al. |
| 10,429,757 B2 | 10/2019 | Yoshida et al. |
| 10,437,165 B2 | 10/2019 | Shimano et al. |
| 10,459,360 B2 | 10/2019 | Suzuki et al. |
| 10,503,090 B2 | 12/2019 | Tominaga et al. |
| 10,545,420 B2 | 1/2020 | Kinumatsu et al. |
| 10,545,422 B2 | 1/2020 | Yamawaki et al. |
| 10,551,758 B2 | 2/2020 | Tanaka et al. |
| 10,564,560 B2 | 2/2020 | Onozaki |
| 10,578,990 B2 | 3/2020 | Tsuda et al. |
| 10,635,010 B2 | 4/2020 | Kamikura et al. |
| 10,635,011 B2 | 4/2020 | Umeda et al. |
| 10,678,155 B2 | 6/2020 | Terui et al. |
| 10,732,530 B2 | 8/2020 | Matsui et al. |
| 10,747,133 B2 | 8/2020 | Yagi et al. |
| 10,747,136 B2 | 8/2020 | Kenmoku et al. |
| 10,782,623 B2 | 9/2020 | Yoshiba et al. |
| 10,845,721 B2 | 11/2020 | Tanaka et al. |
| 10,877,388 B2 | 12/2020 | Aoki et al. |
| 10,877,389 B2 | 12/2020 | Kamikura et al. |
| 10,877,390 B2 | 12/2020 | Shimano et al. |
| 10,942,465 B2 | 3/2021 | Kototani et al. |
| 10,942,466 B2 | 3/2021 | Tominaga et al. |
| 10,976,678 B2 | 4/2021 | Yamawaki et al. |
| 10,976,679 B2 | 4/2021 | Tanaka et al. |
| 11,003,104 B2 | 5/2021 | Katsura et al. |
| 11,003,105 B2 | 5/2021 | Sato et al. |
| 11,112,708 B2 | 9/2021 | Uratani et al. |
| 11,169,458 B2 | 11/2021 | Toyoizumi et al. |
| 11,169,460 B2 | 11/2021 | Kototani et al. |
| 11,175,600 B2 | 11/2021 | Uchiyama et al. |
| 11,181,839 B2 | 11/2021 | Yamashita et al. |
| 11,181,840 B2 | 11/2021 | Nagata et al. |
| 11,181,845 B2 | 11/2021 | Shimoda et al. |
| 11,181,846 B2 | 11/2021 | Kinumatsu et al. |
| 2005/0260514 A1 | 11/2005 | Mihara et al. |
| 2006/0194071 A1 | 8/2006 | Yano et al. |
| 2008/0057431 A1 | 3/2008 | Lai |
| 2008/0299482 A1 | 12/2008 | Kato et al. |
| 2009/0233212 A1 | 9/2009 | Fujikawa et al. |
| 2010/0035171 A1 | 2/2010 | Watanabe et al. |
| 2012/0172562 A1 | 7/2012 | Kenmoku et al. |
| 2013/0065174 A1 | 3/2013 | Itabashi et al. |
| 2014/0356779 A1 | 12/2014 | Hasegawa et al. |
| 2014/0377697 A1 | 12/2014 | Nishiura et al. |
| 2015/0004539 A1 | 1/2015 | Watanabe et al. |
| 2015/0378274 A1 | 12/2015 | Abe et al. |
| 2016/0187797 A1 | 6/2016 | Kosaki |
| 2019/0235404 A1 | 8/2019 | Kamikura |
| 2020/0341395 A1 | 10/2020 | Ookubo et al. |
| 2020/0341398 A1 | 10/2020 | Kawamura et al. |
| 2020/0356019 A1 | 11/2020 | Matsui et al. |
| 2020/0363742 A1 | 11/2020 | Kyuushima et al. |
| 2020/0409282 A1 | 12/2020 | Unno et al. |
| 2021/0003932 A1 | 1/2021 | Tsuda et al. |
| 2021/0026261 A1 | 1/2021 | Ogaki et al. |
| 2021/0026262 A1 | 1/2021 | Kenmoku et al. |
| 2021/0026264 A1 | 1/2021 | Kamikura et al. |
| 2021/0026265 A1 | 1/2021 | Kamikura et al. |
| 2021/0132519 A1 | 5/2021 | Hashimoto et al. |
| 2021/0181646 A1 | 6/2021 | Matsui et al. |
| 2021/0181648 A1 | 6/2021 | Shimano et al. |
| 2021/0302851 A1 | 9/2021 | Toyoizumi et al. |
| 2021/0311405 A1 | 10/2021 | Shiotari et al. |
| 2021/0405549 A1 | 12/2021 | Ookubo et al. |

FOREIGN PATENT DOCUMENTS

| | | |
|---|---|---|
| GB | 1525705 A | 9/1978 |
| GB | 2136981 A | 9/1984 |
| JP | 4-229873 A | 8/1992 |
| JP | 5-100476 A | 4/1993 |
| JP | 6-295096 A | 10/1994 |
| JP | 7-239573 A | 9/1995 |
| JP | 10-213924 A | 8/1998 |
| JP | 11-282194 A | 10/1999 |
| JP | 2000-122341 A | 4/2000 |
| JP | 2002-249530 A | 9/2002 |
| JP | 2005-148409 A | 6/2005 |
| JP | 2006-259359 A | 9/2006 |
| JP | 2007-79304 A | 3/2007 |
| JP | 2007-279712 A | 10/2007 |
| JP | 2010-181439 A | 8/2010 |
| JP | 2012-189692 A | 10/2012 |
| JP | 2013-174745 A | 9/2013 |
| JP | 2014-130243 A | 7/2014 |
| JP | 2015-31767 A | 2/2015 |
| JP | 2015-43049 A | 3/2015 |

(56) References Cited

FOREIGN PATENT DOCUMENTS

| | | | |
|---|---|---|---|
| JP | 2015-75662 | A | 4/2015 |
| JP | 2016-11972 | A | 1/2016 |
| JP | 2016-011973 | * | 1/2016 |
| JP | 2016-11973 | A | 1/2016 |
| JP | 2017-49404 | A | 3/2017 |
| JP | 2017-62367 | A | 3/2017 |
| JP | 2017-167446 | A | 9/2017 |
| JP | 2018-151513 | A | 9/2018 |
| JP | 2019-3082 | A | 1/2019 |
| JP | 2019-28475 | A | 2/2019 |
| JP | 2019-133145 | A | 8/2019 |
| JP | 2019-219643 | A | 12/2019 |
| JP | 2019-219647 | A | 12/2019 |
| JP | 2020-63412 | A | 4/2020 |

OTHER PUBLICATIONS

U.S. Appl. No. 17/502,755, filed Oct. 15, 2021, Takayuki Toyoda.
U.S. Appl. No. 17/502,771, filed Oct. 15, 2021, Shohei Kototani.

* cited by examiner

TONER

BACKGROUND OF THE INVENTION

Field of the Invention

The present disclosure relates to a toner used for forming a toner image by developing an electrostatic latent image formed by a method such as an electrophotographic method, an electrostatic recording method, a toner jet recording method, or the like.

Description of the Related Art

In recent years, lower power consumption has been required for printers and copiers, and improvement of low-temperature fixability of toners is needed. Meanwhile, it is required that toners could be used without problems in various environments, and at the same time, improvement of heat-resistant storage stability of toners is needed. In order to achieve both of these requirements, it is necessary to eliminate a trade-off relationship between softening the toner during fixing and suppressing changes in physical properties during high-temperature storage.

Various studies have been conducted in the past in order to eliminate this trade-off and achieve both low-temperature fixability and heat-resistant storage stability. Japanese Patent Application Publication No. H07-239573 discloses a toner including as a binder resin a vinyl-based resin obtained by copolymerizing a vinyl monomer and a silane coupling agent having an unsaturated double bond and an alkoxysilyl group in order to achieve both low-temperature fixability and heat-resistant storage stability.

SUMMARY OF THE INVENTION

The method described in the above document improves heat-resistant storage stability, which has been conventionally required, but there is much room for improvement in terms of low-temperature fixability.

Further, in order to achieve the toner performance to be required in the future, it is necessary to simultaneously satisfy the contradictory toner performances of further improving the low-temperature fixability and greatly improving the heat-resistant storage stability, but the method in the above document is not sufficiently effective in this respect.

It has been stated in the above document that there is an effect of improving heat-resistant storage stability by preventing deformation of the toner by a three-dimensional network structure of the binder resin created by crosslinking between alkoxysilyl groups in the toner (generation of siloxane bond). However, it has been found that the method described in the above document does not sufficiently reduce the melt viscosity of the toner even at a high temperature during fixing, and low-temperature fixability is not sufficiently satisfactory.

Conversely, where the crosslinking density between the alkoxysilyl groups is lowered so that the melt viscosity of the toner could be sufficiently lowered in order to improve low-temperature fixability, the network structure of the binder resin is naturally reduced. Therefore, the toner tends to melt even during storage, and heat-resistant storage stability deteriorates.

Further, even if the Tg of the binder resin is reduced as a method for improving low-temperature fixability while the crosslinking density remains increased in order to maintain heat-resistant storage stability, since the crosslinking does not thermally decompose and the melt viscosity of the toner is unlikely to decrease, no significant improvement in low-temperature fixability could be confirmed.

Thus, with the method described in the above document, the trade-off relationship between heat-resistant storage stability and low-temperature fixability could not be eliminated, and it was difficult to achieve both low-temperature fixability and heat-resistant storage stability of the toner at a high level despite various attempts.

The present disclosure provides a toner that makes it possible to achieve both low-temperature fixability and heat-resistant storage stability at a high level.

The present disclosure relates to a toner comprising a toner particle, wherein the toner particle comprises a binder resin, a resin A, and a resin B, the resin A comprises a substituted or unsubstituted silyl group in a molecule, a substituent of the substituted silyl group is at least one selected from the group consisting of an alkyl group having 1 or more carbon atoms, an alkoxy group having 1 or more carbon atoms, a hydroxy group, a halogen atom, and an aryl group having 6 or more carbon atoms, and the resin B comprises an azo group in a molecule.

The present disclosure can provide a toner that makes it possible to achieve both low-temperature fixability and heat-resistant storage stability at a high level. Further features of the present invention will become apparent from the following description of exemplary embodiments.

DESCRIPTION OF THE EMBODIMENTS

In the present disclosure, the description of "from XX to YY" or "XX to YY" indicating a numerical range means a numerical range including a lower limit and an upper limit which are end points, unless otherwise specified. When the numerical range is described step by step, the upper and lower limits of each numerical range can be arbitrarily combined.

As a result of diligent studies to solve the above-mentioned problems of the related art, the present inventors have found that the following toner makes it possible to achieve both low-temperature fixability and heat-resistant storage stability at a high level.

The present disclosure relates to a toner comprising a toner particle, wherein the toner particle comprises a binder resin, a resin A, and a resin B, the resin A comprises a substituted or unsubstituted silyl group in a molecule, a substituent of the substituted silyl group is at least one selected from the group consisting of an alkyl group having 1 or more carbon atoms, an alkoxy group having 1 or more carbon atoms, a hydroxy group, a halogen atom, and an aryl group having 6 or more carbon atoms, and the resin B comprises an azo group in a molecule.

The present inventors presume the following about the mechanism that enables a higher degree of both low-temperature fixability and heat-resistant storage than in the conventional toners.

When the toner is stored, the silyl group in the resin A forms a hydrogen bond with the azo group in the resin B inside the toner particle. As a result, a strong crosslinked structure is formed between the resin A and the resin B. Since hydrogen bonds are formed between a plurality of molecules to form a network structure, the toner is less likely to be deformed, and heat-resistant storage stability can be significantly improved.

Meanwhile, the crosslinked structure created by the hydrogen bonds rapidly dissociates in a high-temperature region which is the fixing temperature region. Thus, the network structure of the entire interior of the toner particle is quickly eliminated. As a result, the melt viscosity of the toner is significantly reduced at the time of fixing, and low-temperature fixability can be significantly improved.

That is, it has been found that when the toner is stored, the network structure does not collapse, so that excellent heat-resistant storage stability is achieved, and when the toner is fixed, the hydrogen bonds are quickly broken and the network structure is eliminated, so that excellent low-temperature fixability is achieved.

The toner will be described hereinbelow.

Resin A

The toner particle comprises the resin A. The toner particle preferably includes the resin A inside the toner particle (core). Further, the resin A is preferably an organic resin.

The resin A comprises (a) a substituted silyl group or an unsubstituted silyl group in the molecule thereof, and (b) a substituent of the substituted silyl group is at least one selected from the group consisting of an alkyl group having 1 or more carbon atoms, an alkoxy group having 1 or more carbon atoms, a hydroxy group, a halogen atom, and an aryl group having 6 or more carbon atoms.

The number of carbon atoms in the alkyl group is preferably from 1 to 20, and more preferably from 1 to 4.

The number of carbon atoms in the alkoxy group is preferably from 1 to 20, more preferably from 1 to 4, further preferably from 1 to 3, and particularly preferably 1 or 2.

The number of carbon atoms in the aryl group is preferably from 6 to 14, and more preferably from 6 to 10.

Preferable examples of the resin A is not limited as long as the above conditions (a) and (b) are satisfied. Examples of the resin A include an organic resin with a chemically bonded silane coupling agent or the like, a polymer of an organosilicon compound, and a hybrid resin thereof. More specific examples include resins obtained by modifying a polyester resin, a vinyl resin, a polycarbonate resin, a polyurethane resin, a phenol resin, an epoxy resin, a polyolefin resin, or a styrene acrylic resin with a silane coupling agent and/or a silicone oil or the like.

The resin A preferably has a structure represented by a following formula (1). As a result, hydrogen bonds can be efficiently formed between the resin A and the resin B.

(1)

Where, $P^1$ represents a polymer segment, $L^1$ represents a single bond or a divalent linking group, and $R^1$ to $R^3$ each independently represent a hydrogen atom, a halogen atom, an alkyl group having 1 or more carbon atoms, an alkoxy group having 1 or more carbon atoms, an aryl group having 6 or more carbon atoms, or a hydroxy group, m represents a positive integer, and when m is 2 or more, a plurality of $L^1$, a plurality of $R^1$, a plurality of $R^2$ and a plurality of $R^3$ may each be the same or different.

At least one of $R^1$ to $R^3$ in the formula (1) preferably represents an alkoxy group having 1 or more carbon atoms or a hydroxy group. More preferably, $R^1$ to $R^3$ in the formula (1) each independently represent an alkoxy group having 1 or more carbon atoms or a hydroxy group.

Of the above substituents, the alkyl group preferably has from 1 to 20 carbon atoms, and more preferably from 1 to 4 carbon atoms. The number of carbon atoms in the alkoxy group is preferably from 1 to 20, more preferably from 1 to 4, further preferably from 1 to 3, and particularly preferably 1 or 2. Further, the number of carbon atoms in the aryl group is preferably from 6 to 14, and more preferably from 6 to 10.

The amount of silicon atoms in the resin A is preferably from 0.02% by mass to 10.00% by mass. Within this range, the amount of hydrogen bonds with the azo group in the resin B can be adjusted more appropriately, so that both heat-resistant storage stability and low-temperature fixability can be achieved at a higher level.

The amount of silicon atoms in the resin A is more preferably from 0.10% by mass to 5.00% by mass, and further preferably from 0.20% by mass to 5.00% by mass.

The amount of silicon atoms in the resin A can be controlled by adjusting the amount of the silicon compound used in the production of the resin A.

The amount of the resin A in the toner particle is preferably from 0.1% by mass to 90.0% by mass, more preferably from 0.3% by mass to 30.0% by mass, further preferably from 1.0% by mass to 10.0% by mass, and even more preferably from 1.5% by mass to 5.0% by mass.

When at least one of $R^1$ to $R^3$ in the formula (1) represents an alkoxy group or a hydroxy group having one or more carbon atoms, the structure represented by the formula (1) has a Si—O— bond.

Since the Si—O— bond easily forms a hydrogen bond with the azo group in the resin B, a network structure can be efficiently formed by the hydrogen bonds between the resin A and the resin B that spreads throughout the inside of the toner, and heat-resistant storage stability is greatly improved.

In order to convert one or more of $R^1$ to $R^3$ in the formula (1) into a hydroxy group, the resin A in which one or more of $R^1$ to $R^3$ is an alkoxy group may be hydrolyzed to convert the alkoxy group into a hydroxy group.

Any hydrolysis method may be used and an example thereof is described hereinbelow. The resin A in which at least one of $R^1$ to $R^3$ in the formula (1) is an alkoxy group is dissolved or suspended in a suitable solvent (which may be a polymerizable monomer), and the pH is adjusted to an acidic value with an acid or an alkali, followed by hydrolysis. Also, hydrolysis may be caused during the production of the toner particle.

$P^1$ in the formula (1) is not particularly limited, and can be exemplified by a polyester resin segment, a vinyl resin segment, a styrene acrylic resin segment, a polyurethane resin segment, a polycarbonate resin segment, a phenol resin segment, a polyolefin resin segment and the like.

Among these, from the viewpoint of achieving both heat-resistant storage stability and low-temperature fixability, it is preferable that $P^1$ contains a styrene acrylic resin segment or a polyester resin segment. For example, $P^1$ may be a hybrid resin segment of a polyester resin and a styrene acrylic resin. It is more preferable that $P^1$ be a styrene acrylic resin segment.

The reason for this is thought to be as follows. Since the styrene acrylic resin segment or the polyester resin segment has little intermolecular interaction and easily forms a network structure of the resin A and the resin B having a spread in the binder resin, a contribution is made to the stabilization of the shape of the entire toner particle, and heat-resistant storage stability is improved.

Further, by forming a broad network, the hydrogen bond segments formed by the silyl groups in the resin A and the azo groups in the resin B are likely to be uniformly dispersed in the toner particle. As a result, thermal responsiveness is enhanced and low-temperature fixability is also significantly improved.

In particular, it is preferable that $P^1$ be a styrene acrylic resin segment because in this case, the charge stability of the toner in a high-temperature and high-humidity environment is higher than when $P^1$ is a polyester resin segment, so that the toner is suitable for a wider range of usage environments.

The reason for this is thought to be as follows.

A hydrogen bond is formed between the silyl group in the resin A and the azo group in the resin B, and at this time, the azo group is polarized to δ− and the silyl group is polarized to δ+. The negative charge generated on the surface of the toner propagates to $P^1$ in the resin A via the silyl group in the resin A, so that the charge diffuses into the toner.

When the electric charge propagates through $P^1$ and diffuses, the charge stability of the toner may be affected depending on the insulating property of the $P^1$ itself. Where the insulating property of $P^1$ is extremely low, the negative charge rapidly diffuses in $P^1$ via the silyl group, so that the toner charge may be attenuated and sufficient charge stability may not be expected.

By increasing the insulating property of $P^1$ to some extent, it is possible to suppress excessive charge attenuation, so that charge stability can be improved.

In particular, it was found that when $P^1$ was a styrene acrylic resin segment, the insulating property was higher than when $P^1$ was a polyester resin segment, so that the charge stability was high even in a high-temperature and high-humidity environment.

The styrene acrylic resin and the vinyl resin are not particularly limited, and a known resin can be used. For example, the following monomers can be used.

Styrene-based monomers such as styrene and derivatives thereof such as o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene.

Acrylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate.

Methacrylic acid esters such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate.

Amino group-containing a-methylene aliphatic monocarboxylic acid esters such as dimethylaminoethyl methacrylate and diethylaminoethyl methacrylate; and vinyl monomers including a nitrogen atom such as acrylic acid or methacrylic acid derivatives such as acrylonitrile, methacrylonitrile and acrylamide.

Unsaturated dibasic acids such as maleic acid, citraconic acid, itaconic acid, alkenylsuccinic acid, fumaric acid, and mesaconic acid; α,β-unsaturated acids such as acrylic acid, methacrylic acid, crotonic acid, cinnamic acid; vinyl monomers including a carboxy group such as acid anhydrides of these acids.

In order to form $L^1$ as a linking group, the styrene acrylic resin or vinyl resin may include a carboxy group.

A method of including a carboxy group in the styrene acrylic resin or vinyl resin is not particularly limited, and a known method can be used. For example, it is preferable to use a vinyl-based monomer including a carboxy group, such as acrylic acid and methacrylic acid.

The styrene acrylic resin in the styrene acrylic resin segment is preferably a polymer of a styrene-based monomer and a vinyl monomer including a carboxy group, and at least one selected from the group consisting of an acrylic acid ester and a methacrylic acid ester.

The styrene acrylic resin segment is preferably a copolymer of a styrene-based monomer and a (meth)acrylic acid ester.

The ratio of the styrene-based monomer in the styrene acrylic resin segment can be set in the range of from 0.0 mol % to 100.0 mol %, and is preferably in the range of from 50.0 mol % to 85.0 mol %.

The polyester resin is not particularly limited, but is preferably a condensate of a dialcohol and a dicarboxylic acid.

For example, a polyester resin having a structure represented by the following formula (6) and at least one structure (a plurality of structures can be selected) selected from the group consisting of structures represented by the following formulas (7) to (9) is preferred. Another example is a polyester resin having a structure represented by the following formula (10).

(6)

(7)

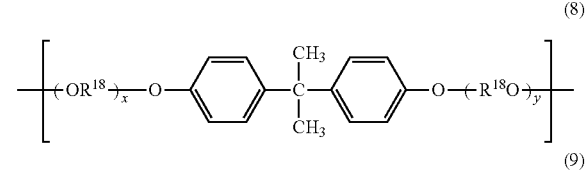

(8)

(9)

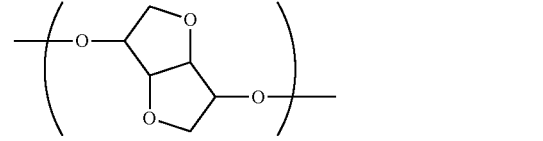

(10)

Where, in formula (6), $R^9$ represents an alkylene group, an alkenylene group, or an arylene group; in formula (7), $R^{10}$ represents an alkylene group or a phenylene group; in formula (8), $R^{18}$ represents an ethylene group or a propylene group, x and y are each an integer of 0 or more, and the average value of x+y is from 2 to 10; in formula (10), RH represents an alkylene group or an alkenylene group.

Examples of the alkylene group (preferably having from 1 to 12 carbon atoms) for $R^9$ in the formula (6) include a methylene group, an ethylene group, a trimethylene group, a propylene group, a tetramethylene group, a hexamethylene group, a neopentylene group, a heptamethylene group, an octamethylene group, a nonamethylene group, a decamethylene group, an undecamethylene group, a dodecamethylene group, and 1,3-cyclopentylene, 1,3-cyclohexylene, and 1,4-cyclohexylene groups.

Examples of the alkenylene group (preferably having from 2 to 4 carbon atoms) for $R^9$ in the formula (6) include a vinylene group, a propenylene group and a 2-butenylene group.

Examples of the arylene group (preferably having from 6 to 12 carbon atoms) for $R^9$ in the formula (6) include a 1,4-phenylene group, a 1,3-phenylene group, a 1,2-phenylene group, a 2,6-naphthylene group, a 2,7-naphthylene group and a 4,4'-biphenylene group.

$R^9$ in the formula (6) may be substituted with a substituent. In this case, examples of the substituent include a methyl group, a halogen atom, a carboxy group, a trifluoromethyl group, and a combination thereof.

Examples of the alkylene group (preferably having from 1 to 12 carbon atoms) for $R^{10}$ in the formula (7) include a methylene group, an ethylene group, a trimethylene group, a propylene group, a tetramethylene group, a hexamethylene group, a neopentylene group, a heptamethylene group, an octamethylene group, a nonamethylene group, a decamethylene group, an undecamethylene group, a dodecamethylene group, and 1,3-cyclopentylene, 1,3-cyclohexylene, and 1,4-cyclohexylene groups.

Examples of the phenylene group for $R^{10}$ in the formula (7) include a 1,4-phenylene group, a 1,3-phenylene group, and a 1,2-phenylene group.

$R^{10}$ in the formula (7) may be substituted with a substituent. In this case, examples of the sub stituent include a methyl group, an alkoxy group, a hydroxy group, a halogen atom, and a combination thereof.

Examples of the alkylene group (preferably having from 1 to 12 carbon atoms) for $R^{11}$ in the formula (10) include a methylene group, an ethylene group, a trimethylene group, a propylene group, a tetramethylene group, a hexamethylene group, a neopentylene group, a heptamethylene group, an octamethylene group, a nonamethylene group, a decamethylene group, an undecamethylene group, a dodecamethylene group, and a 1,4-cyclohexylene group.

Examples of the alkenylene group (preferably having from 2 to 40 carbon atoms) for $R^{11}$ in the formula (10) include a vinylene group, a propenylene group, a butenylene group, a butadienylene group, a pentenylene group, a hexenylene group, a hexadienylene group, a heptenylene group, an octanylene group, a decenylene group, an octadecenylene group, an eicosenylene group, and a triacontenylene group. These alkenylene groups may have any of a linear, branched and cyclic structure. Further, the double bond may be at any position, as long as there is at least one double bond.

$R^{11}$ in the formula (10) may be substituted with a substituent. In this case, examples of the substituent that may be used for substitution include an alkyl group, an alkoxy group, a hydroxy group, a halogen atom, and a combination thereof.

Examples of the divalent linking group represented by $L^1$ in the formula (1) include, but are not limited to, structures represented by the following formulas (2) to (5).

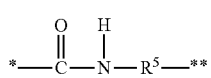

(2)

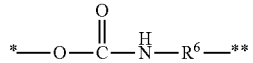

(3)

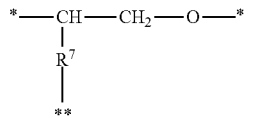

(4)

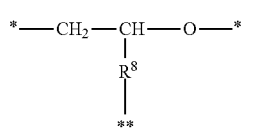

(5)

($R^5$ in the formula (2) represents a single bond, an alkylene group or an arylene group. (*) represents a binding site to $P^1$ in the formula (1), and (**) represents the binding site to the silicon atom in the formula (1).

$R^6$ in the formula (3) represents a single bond, an alkylene group or an arylene group. (*) represents the binding site to $P^1$ in the formula (1), and (**) represents the binding site to the silicon atom in the formula (1).

$R^7$ and $R^8$ in the formulas (4) and (5) independently represent an alkylene group, an arylene group, or an oxyalkylene group. (*) represents the binding site to $P^1$ in the formula (1), and (**) represents the binding site to the silicon atom in the formula (1).

Among these, $L^1$ is preferably a divalent linking group including an amide bond and represented by the formula (2) because the brittleness of the toner can be improved.

It is assumed that the reason why the brittleness is improved is that the amide bond in the formula (2) expresses the dipole interaction with the azo group in the resin B.

Where the brittleness of the toner is improved, even if stress is applied to the toner due to contact with a member in the developing process, problems such as cracking or chipping of the toner do not occur, contamination of the member is reduced, and a stable developing process can be realized.

The structure represented by the formula (2) is a divalent linking group including an amide bond.

The linking group can be formed, for example, by reacting a carboxy group in the resin with an aminosilane.

The amino silane is not particularly limited, and examples thereof include γ-aminopropyltriethoxysilane, γ-aminopropyltrimethoxysilane, N-β-(aminoethyl) γ-aminopropyltrimethoxysilane, N-β-(aminoethyl) γ-aminopropylmethyldimethoxysilane, N-phenyl γ-aminopropyltriethoxysilane, N-phenyl γ-aminopropyltrimethoxysilane, N-β-(aminoethyl) γ-aminopropyltriethoxysilane, N-6-(aminohexyl) 3-aminopropyltrimethoxysilane, 3-aminopropyltrimethylsilane, 3-aminopropylsilicon and the like.

The alkylene group (preferably having from 1 to 12 carbon atoms, and more preferably having from 2 to 4 carbon atoms) in $R^5$ is not particularly limited, and may be, for example, an alkylene group including an —NH— group.

The arylene group (preferably having from 6 to 12 carbon atoms, and more preferably having from 6 to 10 carbon atoms) in $R^5$ is not particularly limited, and may be, for example, an arylene group including a hetero atom.

The structure represented by the formula (3) is a divalent linking group including a urethane bond.

The linking group can be formed, for example, by reacting a hydroxy group in the resin with an isocyanate silane.

The isocyanate silane is not particularly limited, and examples thereof include 3-isocyanatopropyltrimethoxysilane, 3-isocyanatopropylmethyldimethoxysilane, 3-isocyanatopropyldimethylmethoxysilane, 3-isocyanatopropyltriethoxysilane, 3-isocyanatopropylmethyldiethoxysilane, 3-isocyanatopropyldimethylethoxysilane and the like.

The alkylene group (preferably having from 1 to 12 carbon atoms, and more preferably having from 2 to 4 carbon atoms) in $R^6$ is not particularly limited, and may be, for example, an alkylene group including an —NH— group.

The arylene group (preferably having from 6 to 12 carbon atoms, and more preferably having from 6 to 10 carbon atoms) in $R^6$ is not particularly limited, and may be, for example, an arylene group including a hetero atom.

The structure represented by the formula (4) or (5) is a divalent linking group including a bond grafted to an ester bond in the resin.

The linking group is formed by, for example, an epoxysilane insertion reaction.

The term "epoxysilane insertion reaction" refers to a reaction including a step of causing an insertion reaction of an epoxy group of epoxysilane into an ester bond contained in a main chain in a resin. Further, the term "insertion reaction" as used herein is described in "Journal of Synthetic Organic Chemistry, Japan", Vol. 49, No. 3, p. 218, 1991, as "an insertion reaction of an epoxy compound into an ester bond in a polymer chain".

The reaction mechanism of the epoxysilane insertion reaction can be represented by the following model diagram.

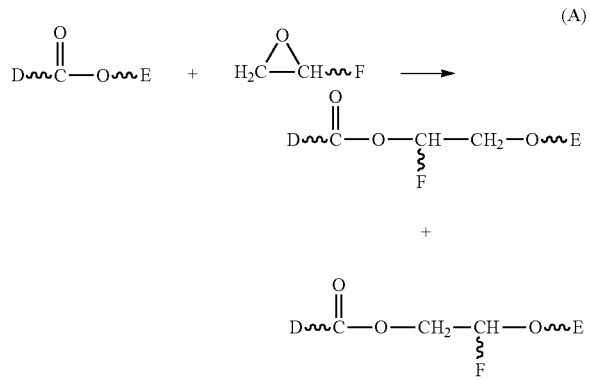

(A)

In the above diagram, D and E indicate the constituent parts of the resin, and F indicates the constituent part of the epoxy compound.

Two kinds of compounds are formed due to α-cleavage and β-cleavage in the ring opening of the epoxy group in the diagram. In both cases, a compound is obtained in which an epoxy group is inserted into an ester bond in a resin, in other words, a compound in which a constituent part of the epoxy compound other than the epoxy segment is grafted to the resin.

The epoxysilane is not particularly limited, and may be, for example, β-(3,4-epoxycyclohexyl)ethyltrimethoxysilane, γ-glycidoxypropyltrimethoxysilane, γ-glycidoxypropylmethyldiethoxysilane and the like.

The alkylene group (preferably having from 1 to 12 carbon atoms, and more preferably having from 2 to 4 carbon atoms) in $R^7$ and $R^8$ is not particularly limited, and may be, for example, an alkylene group including an —NH— group.

The arylene group (preferably having from 6 to 12 carbon atoms, and more preferably having from 6 to 10 carbon atoms) in $R^7$ and $R^8$ is not particularly limited, and may be, for example, an arylene group including a hetero atom.

The oxyalkylene group (preferably having from 1 to 12 carbon atoms, and more preferably having from 2 to 4 carbon atoms) in $R^7$ and $R^8$ is not particularly limited, and may be, for example, an oxyalkylene group including an —NH— group.

From the viewpoint of achieving both heat-resistant storage stability and low-temperature fixability, weight average molecular weight (Mw) of the resin A is preferably from 2000 to 100000, more preferably from 3000 to 100000, and even more preferably from 8000 to 35000.

It is preferable that the resin A be a polymer in order to further improve the heat-resistant storage stability. The weight average molecular weight (Mw) of the resin A is preferably 2000 or more. Within this range, the resin A and the azo groups in the resin B form hydrogen bonds, and it is easy to form a network that spreads three-dimensionally, so that the heat-resistant storage stability is further improved.

Further, from the viewpoint of improving the low-temperature fixability, the weight average molecular weight (Mw) of the resin A is preferably 100000 or less.

Various methods can be used for controlling the Mw of the resin A depending on the type of resin contained. For example, when a polyester resin is contained, the molecular weight can be controlled by adjusting the loading ratio of the dialcohol and dicarboxylic acid, which are monomers, adjusting the polymerization time, and the like. When a styrene acrylic resin is contained, the molecular weight can be controlled by adjusting the ratio of the vinyl monomer, which is the monomer, and the polymerization initiator or adjusting the reaction temperature.

Resin B

The toner particle comprises the resin B. The resin B comprises an azo group in the molecule.

A resin in which a "compound including an azo group" is linked to an "organic resin" is a specific example of the resin having an azo group. Examples of the "compound including an azo group" in the resin B include an aliphatic azo compound, an aromatic azo compound, a β-diketone azo compound, and the like, and any type of azo compound can be advantageously used for forming a hydrogen bond with the silyl group in the resin A.

Among them, the compound including an azo group is more preferably an aromatic azo compound represented by a following formula (11) or a β-diketone azo compound represented by a following formula (12).

$$Ar^1—N=N—Ar^2 \quad (11)$$

In the formula (11), $Ar^1$ and $Ar^2$ each independently represent a substituted or unsubstituted aromatic group. Examples of the substituent include an alkyl group having from 1 to 3 carbon atoms, an alkoxy group having from 1 to 3 carbon atoms, a hydroxy group, a halogen atom, and a combination thereof. However, at least one of $Ar^1$ and $Ar^2$ has a substituent. This substituent reacts with a substituent in the organic resin to form a binding segment with the organic resin.

$Ar^1$ and $Ar^2$ are each independently preferably a substituted or unsubstituted aryl group (preferably having from 6 to 12 carbon atoms, more preferably from 6 to 10 carbon atoms). Examples of the substituent of $Ar^1$ and $Ar^2$ include an amino group, a hydroxy group, a carboxy group, a methyl group, a dimethylamino group, an aminocarbonyl group, an aminocarbonylamino group, an alkyloxycarbonyl group having from 1 to 4 carbon atoms, an imidazolidinone structure, and combinations thereof. Examples of the substituent that forms a binding segment with the organic resin in the resin B as a linking group include an amino group, a hydroxy group, and a carboxy group.

For example, an amide bond with the organic resin in the resin B as a linking group can be formed by an amino group or a carboxy group.

Further, for example, an ester bond with the organic resin in the resin B as a linking group can be formed by a hydroxy group or a carboxy group.

It is more preferable that $Ar^1$ and $Ar^2$ each be independently a phenyl group, an aminophenyl group, a hydroxyphenyl group, a carboxyphenyl group, a methylphenyl group, or a dimethylaminophenyl group. At least one of $Ar^1$ and $Ar^2$ is preferably a hydroxyphenyl group, a carboxyphenyl group, or an aminophenyl group, and more preferably an aminophenyl group.

An amide bond with the carboxy group of the organic resin in the resin B as a linking group can be formed by an aminophenyl group.

The resin B can be obtained by reacting the compound of formula (11) with an organic resin to form, for example, an ester bond, an amide bond, or a urethane bond as a linking group. That is, the resin B preferably has a structure represented by a following formula (11A).

(11A)

In the formula (11A), $Ar^{11}$ and $Ar^{21}$ each independently represent a substituted or unsubstituted aromatic group. Examples of the substituents of $Ar^{11}$ and $Ar^{21}$ include an amino group, a hydroxy group, a carboxy group, a methyl group, a dimethylamino group, an aminocarbonyl group, an aminocarbonylamino group, an alkyloxycarbonyl group having from 1 to 4 carbon atoms, an imidazolidinone structure, and combinations thereof. However, at least one of $Ar^{11}$ and $Ar^{21}$ has a divalent substituent, and the divalent substituent forms a binding segment with the organic resin in the resin B.

More preferably, $Ar^{11}$ and $Ar^{21}$ each independently have a structure represented by following formulas (A) to (F), and at least one of $Ar^{11}$ and $Ar^{21}$ has a structure that is represented by the following formula (A) or (B). *** in the formula (A) or (B) indicates a binding site with the resin B. X in the formula (B) represents a single bond or an alkylene group having from 1 to 6 carbon atoms. The structures represented by the formulas (A) to (F) are substituted or unsubstituted, and examples of the substituents include an alkyl group having from 1 to 3 carbon atoms, an alkoxy group having from 1 to 3 carbon atoms, a hydroxy group, a halogen atom, and combinations thereof.

(A)

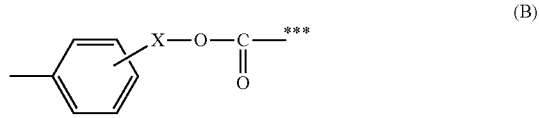

(B)

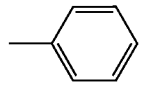

(C)

(D)

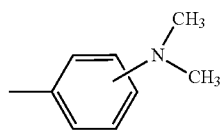

(E)

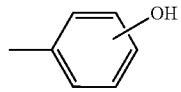

(F)

The β-diketone azo compound represented by the formula (12) is as follows.

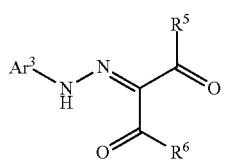

(12)

In formula (12), $R^5$ and $R^6$ independently represent a substituted or unsubstituted alkyl group, a substituted or unsubstituted phenyl group, an $OR^7$ group, or an $NR^8R^9$ group. $R^7$ to $R^9$ each independently represent a hydrogen atom, a substituted or unsubstituted alkyl group, a substituted or unsubstituted phenyl group, or an aralkyl group.

$Ar^3$ represents a substituted or unsubstituted aryl group. Examples of the substituent in $R^5$, $R^6$ and $Ar^3$ include an amino group, a hydroxy group, a carboxy group, a methyl group, a dimethylamino group, an aminocarbonyl group, an aminocarbonylamino group, an alkyloxycarbonyl group having from 1 to 4 carbon atoms, an imidazolidinone structure, or combinations thereof.

However, at least one of $R^5$, $R^6$, and $Ar^3$ has a substituent. This substituent reacts with a substituent in the organic resin to form a binding segment with the organic resin.

Preferably, $R^5$ and $R^6$ are each independently an alkyl group having from 1 to 3 carbon atoms or an $-NR^8R^9$ group. It is more preferable that at least one of $R^5$ and $R^6$ be an $-NR^8R^9$ group. It is preferable that $R^8$ be a hydrogen atom and $R^9$ be an aminophenyl group.

The aminophenyl group can form, for example, an amide bond with the carboxy group of the organic resin in the resin B as a linking group.

$Ar^3$ is preferably a group represented by following formulas (I) to (IV). $R^{21}$ and $R^{22}$ of the formula (I) are each independently an alkyl group having from 1 to 4 carbon atoms. The structures represented by the formulas (I) to (IV) are substituted or unsubstituted, and the examples of the substituent include an alkyl group having from 1 to 3 carbon atoms, an alkoxy group having from 1 to 3 carbon atoms, a hydroxy group, a halogen atom, and combinations thereof.

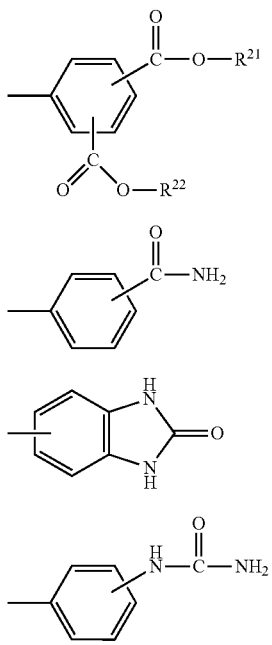

The resin B can be obtained by reacting the compound of formula (12) with an organic resin to form, for example, an ester bond, an amide bond, or a urethane bond as a linking group. That is, the resin B preferably has a structure represented by a following formula (12A).

In the formula (12A), $R^{51}$ and $R^{61}$ each independently represent a substituted or unsubstituted alkyl group, a substituted or unsubstituted phenyl group, an $OR^7$ group, or an $NR^8R^9$ group. $R^7$ to $R^9$ each independently represent a hydrogen atom, a substituted or unsubstituted alkyl group, a substituted or unsubstituted phenyl group, or an aralkyl group.

$Ar^{31}$ represents a substituted or unsubstituted aryl group. Examples of the substituent of $R^{51}$, $R^{61}$, and $Ar^{31}$ include an amino group, a hydroxy group, a carboxy group, a methyl group, a dimethylamino group, an aminocarbonyl group, an aminocarbonylamino group, an alkyloxycarbonyl group having from 1 to 4 carbon atoms, an imidazolidinone structure, or combinations thereof. However, at least one of $R^{51}$, $R^{61}$, and $Ar^{31}$ has a divalent substituent, and the divalent substituent forms a binding segment with the organic resin in the resin B.

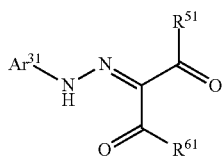

Preferably, $R^{51}$ and $R^{61}$ each independently represent an alkyl group having from 1 to 3 carbon atoms or a structure represented by a following formula (X). It is more preferable that at least one of $R^{51}$ and $R^{61}$ be a structure represented by the following formula (X). *** in the formula (X) indicates a binding site with the main chain of the organic resin.

$Ar^{31}$ is preferably a group represented by the above formulas (I) to (IV). $R^{21}$ and $R^{22}$ of the formula (I) are each independently an alkyl group having from 1 to 4 carbon atoms. The structures represented by the formulas (I) to (IV) and the formula (X) are substituted or unsubstituted, and the examples of the substituent include an alkyl group having from 1 to 3 carbon atoms, an alkoxy group having from 1 to 3 carbon atoms, and a hydroxy group, a halogen atom, and combinations thereof.

The linking group in the resin B is not particularly limited, and examples thereof include an amide group, an ester group, a urethane group, a urea group, an alkylene group, a phenylene group, a group represented by —O—, a group represented by —NR$^{20}$— (R$^{20}$ represents a hydrogen atom, an alkyl group, a phenyl group, or an aralkyl group), and a divalent linking group having a partial structure represented by —NHCH(CH$_2$OH)—, and the like.

The linking group is preferably an amide group or an ester group.

The linking group may be constituted only by a divalent functional group derived from a substituent of the compound including an azo group, or the linking group may be formed by bonding a divalent functional group derived from a substituent of the compound including an azo group with a divalent functional group derived from an organic resin. For example, when an organic resin having —COOH and a "compound including an azo group" having —NH$_2$ are reacted, the linking group becomes —CONH— in which —CO— derived from the organic resin and —NH— derived from a compound including an azo group are bonded to each other.

Examples of the alkyl group in R$^{20}$ include straight-chain, branched or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group.

Examples of the aralkyl group in R$^{20}$ include a benzyl group and a phenethyl group.

The "organic resin" in the resin B is not particularly limited, and examples thereof include a polyester resin segment, a vinyl resin segment, a styrene acrylic resin segment, a polyurethane resin segment, a polycarbonate resin segment, a phenol resin segment, and a polyolefin resin segment.

Among these, from the viewpoint of achieving both heat-resistant storage stability and low-temperature fixability, it is preferable that the "organic resin" include a styrene acrylic resin segment and/or a polyester resin segment. Further, the organic resin may be, for example, a hybrid resin segment of a polyester resin and a styrene acrylic resin.

It is more preferable that the "organic resin" be a styrene acrylic resin segment or a polyester resin segment. From the viewpoint of suppressing charge-up in a low-temperature and low-humidity environment, it is more preferable that the organic resin be a styrene acrylic segment.

The styrene acrylic resin and the polyester resin in the styrene acrylic resin segment and the polyester resin segment are the same as those described above for the resin A.

The amount of the resin B in the toner particle is preferably from 0.1% by mass to 90.0% by mass, more preferably from 0.3% by mass to 30.0% by mass, further preferably from 1.0% by mass to 10.0% by mass, and even more preferably from 1.5% by mass to 5.0% by mass.

From the viewpoint of achieving both heat-resistant storage stability and low-temperature fixability, the weight average molecular weight (Mw) of the resin B is preferably from 2000 to 100000, more preferably from 3000 to 100000, and even more preferably from 10000 to 30000.

From the viewpoint of improving heat-resistant storage stability, the weight average molecular weight (Mw) of the resin B is preferably 2000 or more. Within this range, it becomes easy to form a network that spreads three-dimensionally.

Further, from the viewpoint of low-temperature fixability, the weight average molecular weight (Mw) of the resin B is preferably 100000 or less.

Various methods can be used for controlling the Mw of the resin B depending on the type of resin contained. For example, when a polyester resin is contained, the molecular weight can be controlled by adjusting the loading ratio of the dialcohol and dicarboxylic acid, which are monomers, adjusting the polymerization time, and the like. When a styrene acrylic resin is contained, the molecular weight can be controlled by adjusting the ratio of the vinyl monomer, which is the monomer, and the polymerization initiator or adjusting the reaction temperature.

Binder Resin

A toner particle includes a binder resin.

From the viewpoint of achieving both heat-resistant storage stability and low-temperature fixability of the toner, it is preferable that following relational expressions (i) and (ii) be satisfied:

$$Tg(A) > Tg(C) \quad \text{(i)}$$

$$Tg(B) > Tg(C) \quad \text{(ii)}$$

where Tg(A) stands for a glass transition temperature Tg of the resin A, Tg(B) stands for a glass transition temperature Tg of the resin B, and Tg(C) stands for a glass transition temperature Tg of the binder resin.

Where the Tg(C) of the binder resin is lowered and the heat-melt viscosity of the toner is lowered in order to improve the low-temperature fixability, the binder resin may become soft even when the toner is stored. It has been found that the existence of a network formed of the resin (A) and the resin (B) works effectively to impart the toner particle with resistance to deformation caused by the soft binder resin. It is considered that the network formed of the resin (A) and the resin (B) plays a role such as that of a skeleton inside the toner particle.

In particular, satisfying the above (i) and (ii) is effective in achieving both heat-resistant storage stability and low-temperature fixability.

Tg(A)-Tg(C) is preferably from 5° C. to 50° C., and more preferably from 10° C. to 45° C.

Tg(B)-Tg(C) is preferably from 2° C. to 25° C., and more preferably from 5° C. to 20° C.

Tg(A) is preferably from 55° C. to 100° C., and more preferably from 60° C. to 95° C.

Tg(B) is preferably from 52° C. to 75° C., and more preferably from 55° C. to 70° C.

Tg(C) is preferably from 40° C. to 60° C., and more preferably from 45° C. to 55° C.

In the toner particle, the amount of the resin A with respect to 100.0 parts by mass of the binder resin is preferably from 0.1 part by mass to 20.0 parts by mass, more preferably from 0.3 parts by mass to 5.0 parts by mass, and even more preferably from 1.5 parts by mass to 4.5 parts by mass.

Further, in the toner particle, the amount of the resin B with respect to 100.0 parts by mass of the binder resin is preferably from 0.1 part by mass to 20.0 parts by mass, more preferably from 0.3 parts by mass to 5.0 parts by mass, and even more preferably from 1.5 parts by mass to 4.5 parts by mass.

The binder resin is not particularly limited, and a conventionally known binder resin can be used. For example, a vinyl resin, a polyester resin and the like are preferable. The following resins and polymers can be exemplified as the vinyl resin, polyester resin and other binder resin. The vinyl resin is preferably a styrene acrylic resin.

Homopolymers of styrene and substituted products thereof such as polystyrene and polyvinyltoluene;

styrene-based copolymers such as styrene-propylene copolymer, styrene-vinyl toluene copolymer, styrene-vinyl naphthalene copolymer, styrene-methyl acrylate copolymer, styrene-ethyl acrylate copolymer, styrene-butyl acrylate copolymer, styrene-octyl acrylate copolymer, styrene-dimethylaminoethyl acrylate copolymer, styrene-methyl methacrylate copolymer, styrene-ethyl methacrylate copolymer, styrene-butyl methacrylate copolymer, styrene-dimethylaminoethyl methacrylate copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-maleic acid copolymer, and styrene-maleic acid ester copolymer;

polymethyl methacrylate, polybutyl methacrylate, polyvinyl acetate, polyethylene, polypropylene, polyvinyl butyral, silicone resins, polyamide resins, epoxy resins, polyacrylic resins, rosin, modified rosin, terpene resin, phenolic resins, aliphatic or alicyclic hydrocarbon resins and aromatic petroleum resins.

These binder resins can be used alone or as a mixture of a plurality thereof.

From the viewpoint of charging performance, the binder resin preferably includes a carboxy group, and is preferably a resin produced using a polymerizable monomer including a carboxy group. Specific examples of the polymerizable monomer including a carboxy group include, for example, the following polymerizable monomers, but are not limited thereto.

(Meth)acrylic acid α-alkyl derivatives or β-alkyl derivatives such as α-ethylacrylic acid and crotonic acid; unsaturated dicarboxylic acids such as fumaric acid, maleic acid, citraconic acid, and itaconic acid; and unsaturated dicarboxylic acid monoester derivatives such as monoacryloyloxyethyl succinate, monoacryloyloxyethyl succinate, monoacryloyloxyethyl phthalate, and monomethacryloyloxyethyl phthalate.

As the polyester resin, those obtained by polycondensation of a carboxylic acid component and an alcohol component listed hereinbelow can be used.

Examples of the carboxylic acid component include terephthalic acid, isophthalic acid, phthalic acid, fumaric acid, maleic acid, cyclohexanedicarboxylic acid, and trimellitic acid.

Examples of the alcohol component include bisphenol A, hydrogenated bisphenol, ethylene oxide adduct of bisphenol A, propylene oxide adduct of bisphenol A, glycerin, trimethylolpropane, and pentaerythritol.

Further, the polyester resin may be a polyester resin including a urea group. It is preferable that the carboxy group present at the polyester resin terminal or the like be not capped.

The binder resin may have a polymerizable functional group for the purpose of improving the viscosity change of the toner at a high temperature. Examples of the polymerizable functional group include a vinyl group, an isocyanate group, an epoxy group, an amino group, a carboxy group, and a hydroxy group.

In addition to the above, the same monomer as the styrene acrylic resin segment of the resin A can be used for the vinyl-based resin and the styrene acrylic resin in the binder resin.

Preferably, the binder resin is a copolymer of styrene and a (meth)acrylic acid alkyl ester with an alkyl group having from 1 to 8 (preferably from 2 to 6) carbon atoms, and more preferably a styrene-butyl acrylate copolymer. The copolymerization ratio (styrene:(meth)acrylic acid alkyl ester (mass ratio)) is preferably from 55:45 to 80:20, and more preferably from 60:40 to 70:30.

<Crosslinking Agent>

In order to control the molecular weight of the binder resin, a crosslinking agent may be added during the polymerization of the polymerizable monomer.

For example, the following compounds can be used as the crosslinking agent, but these examples are not limiting.

Ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, polyethylene glycol #200, #400, #600 diacrylate, dipropylene glycol diacrylate, polypropylene glycol diacrylate and polyester type diacrylate (MANDA, manufactured by Nippon Kayaku Co., Ltd.), and the above acrylates converted to methacrylates.

The amount of the crosslinking agent to be added is preferably from 0.001 parts by mass to 15.0 parts by mass based on 100 parts by mass of the polymerizable monomer.

<Release Agent>

The toner particle may include a wax.

For example, the following waxes can be used, but these examples are not limiting.

Esters of monohydric alcohols and aliphatic monocarboxylic acids, or esters of monovalent carboxylic acids and aliphatic monoalcohols, such as behenyl behenate, stearyl stearate, and palmityl palmitate; esters of dihydric alcohols and aliphatic monocarboxylic acids, or esters of divalent carboxylic acids and aliphatic monoalcohols, such as dibehenyl sebacate and hexanediol dibehenate; esters of trihydric alcohols and aliphatic monocarboxylic acids, or esters of trivalent carboxylic acids and aliphatic monoalcohols, such as glycerin tribehenate; esters of tetrahydric alcohols and aliphatic monocarboxylic acids, or esters of tetravalent carboxylic acids and aliphatic monoalcohols, such as pentaerythritol tetrastearate and pentaerythritol tetrapalmitate; esters of hexahydric alcohols and aliphatic monocarboxylic acids, or esters of hexavalent carboxylic acids and aliphatic monoalcohols, such as dipentaerythritol hexastearate and dipentaerythritol hexapalmitate; esters of polyhydric alcohols and aliphatic monocarboxylic acids, or esters of poly-valent carboxylic acids and aliphatic monoalcohols, such as polyglycerin behenate; natural ester waxes such as carnauba wax and rice wax; petroleum waxes and derivatives thereof such as paraffin wax, microcrystalline wax, and petrolatum; hydrocarbon waxes and derivatives thereof obtained by the Fischer-Tropsch method; polyolefin waxes and derivatives thereof such as polyethylene wax and polypropylene wax; higher aliphatic alcohols; fatty acids such as stearic acid and palmitic acid; and acid amide waxes.

The content of the wax in the toner particle is preferably from 0.5% by mass to 20.0% by mass.

<Colorant>

The toner particle may include a colorant. The colorant is not particularly limited, and for example, the following known colorants can be used.

Examples of yellow pigment include yellow iron oxide, and condensed azo compounds such as Navels Yellow, Naphthol Yellow S, Hanza Yellow G, Hanza Yellow 10G, Benzidine Yellow G, Benzidine Yellow GR, Quinoline Yellow Lake, Permanent Yellow NCG, and Tartrazine Lake, isoindolinone compounds, anthraquinone compounds, azo metal complexes, methine compounds, and allylamide compounds. Specific examples are presented hereinbelow.

C. I. Pigment Yellow 12, 13, 14, 15, 17, 62, 74, 83, 93, 94, 95, 109, 110, 111, 128, 129, 147, 155, 168, and 180.

Examples of orange pigments are presented below.

Permanent Orange GTR, Pyrazolone Orange, Vulcan Orange, Benzidine Orange G, Indanthrene Brilliant Orange RK, and Indanthrene Brilliant Orange GK.

Examples of red pigments include Indian Red, condensation azo compounds such as Permanent Red 4R, Lithol Red, Pyrazolone Red, Watching Red calcium salt, Lake Red C, Lake Red D, Brilliant Carmine 6B, Brilliant Carmine 3B, Eosin Lake, Rhodamine Lake B, Alizarin Lake and the like, diketopyrrolopyrrole compounds, anthraquinone compounds, quinacridone compounds, basic dye lake compounds, naphthol compounds, benzimidazolone compounds, thioindigo compounds, and perylene compounds. Specific examples are presented hereinbelow.

C. I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254.

Examples of blue pigments include copper phthalocyanine compounds and derivatives thereof such as Alkali Blue Lake, Victoria Blue Lake, Phthalocyanine Blue, metal-free Phthalocyanine Blue, partial Phthalocyanine Blue chloride, Fast Sky Blue, Indathrene Blue BG and the like, anthraquinone compounds, basic dye lake compound and the like. Specific examples are presented hereinbelow.

C. I. Pigment Blue 1, 7, 15, 15:1, 15:2, 15:3, 15:4, 60, 62, and 66.

Examples of purple pigments include Fast Violet B and Methyl Violet Lake.

Examples of green pigments include Pigment Green B, Malachite Green Lake, and Final Yellow Green G.

Examples of the white pigment include zinc white, titanium oxide, antimony white, and zinc sulfide.

Examples of black pigments include carbon black, aniline black, nonmagnetic ferrites and magnetite, and those toned to black using the abovementioned yellow colorant, red colorant and blue colorant.

These colorants may be used singly or as a mixture of a plurality thereof. These colorants can be used in the form of a solid solution.

If necessary, the colorant may be subjected to a surface treatment with a substance which does not inhibit polymerization.

The content of the colorant in the toner particle is preferably from 3.0% by mass to 15.0% by mass.

<Charge Control Agent>

The toner particle may include a charge control agent. The charge control agent is not particularly limited, and a known charge control agent can be used. In particular, a charge control agent that has a high charging speed and can stably maintain a constant charge quantity is preferable. Further, where the toner particles are produced by a direct polymerization method, a charge control agent having a low polymerization inhibition property and having substantially no matter soluble in an aqueous medium is particularly preferable.

Examples of charge control agents that control the toner particle to be negatively chargeable are presented hereinbelow.

Organometallic compounds and chelate compounds exemplified by monoazo metal compounds, acetylacetone metal compounds, and metal compounds based on aromatic hydroxycarboxylic acids, aromatic dicarboxylic acids, hydroxycarboxylic acids and dicarboxylic acids. Other examples include aromatic hydroxycarboxylic acids, aromatic mono- and polycarboxylic acids and metal salts, anhydrides, esters, phenol derivatives, such as bisphenol, thereof and the like. Furthermore, urea derivatives, metal-containing salicylic acid compounds, metal-containing naphthoic acid compounds, boron compounds, quaternary ammonium salts, and calixarenes can be mentioned.

Meanwhile, examples of charge control agents that control the toner particle to be positively chargeable are presented hereinbelow.

Nigrosine modified products such as nigrosine and fatty acid metal salts; guanidine compounds; imidazole compounds; quaternary ammonium salts such as tributylbenzylammonium-1-hydroxy-4-naphthosulfonate and tetrabutylammonium tetrafluoroborate, onium salts such as phosphonium salts, which are analogs thereof, and lake pigments thereof; triphenylmethane dyes and lake pigments thereof (examples of lake conversion agents include phosphorotungtic acid, phosphomolybdic acid, phosphotungsten molybdic acid, tannic acids, lauric acid, gallic acid, ferricyanides, ferrocyanides, and the like); metal salts of higher fatty acids; and resin-based charge control agents.

These charge control agents can be used singly or in combination of a plurality thereof. The content of these charge control agents in the toner particle is preferably from 0.01% by mass to 10.0% by mass.

<External Additive>

The toner particle may be used as it is as a toner, but in order to improve flowability, charging performance, cleaning property, and the like, a fluidizing agent, a cleaning aid or the like, which is the so-called external additive, may be added to obtain the toner.

Examples of the external additive include inorganic oxide fine particles such as silica fine particles, alumina fine particles, titanium oxide fine particles, and the like; inorganic stearic acid compound fine particles such as aluminum stearate fine particles, zinc stearate fine particles and the like; inorganic titanium oxide fine particles such as strontium titanate, zinc titanate, and the like; and the like. These can be used singly or in combination of a plurality thereof.

These inorganic fine particles are preferably subjected to a gloss treatment with a silane coupling agent, a titanium coupling agent, a higher fatty acid, a silicone oil or the like in order to improve heat-resistant storability and environmental stability. The BET specific surface area of the external additive is preferably from 10 $m^2/g$ to 450 $m^2/g$.

The BET specific surface area is determined by a low-temperature gas adsorption method based on a dynamic constant pressure method according to a BET method (preferably a BET multipoint method). For example, the BET specific surface area ($m^2/g$) is calculated by adsorbing nitrogen gas on the surface of a sample and performing measurement by the BET multipoint method by using a specific surface area measuring apparatus (trade name: GEMINI 2375 Ver. 5.0, manufactured by Shimadzu Corporation).

The total amount of these various external additives is preferably from 0.05 parts by mass to 10.00 parts by mass, and more preferably from 0.10 parts by mass to 5.00 parts by mass with respect to 100.00 parts by mass of the toner particles. Various external additives may be used in combination.

<Developer>

The toner can be used as a magnetic or nonmagnetic one-component developer, but it may be also mixed with a carrier and used as a two-component developer.

As the carrier, magnetic particles composed of conventionally known materials such as metals such as iron, ferrites, magnetite and alloys of these metals with metals such as aluminum, lead and the like can be used. Among them, ferrite particles are preferable. Further, a coated carrier obtained by coating the surface of magnetic particles with a coating agent such as a resin, a resin dispersion type carrier obtained by dispersing magnetic fine powder in a binder resin, or the like may be used as the carrier.

The volume average particle diameter of the carrier is preferably from 15 μm to 100 μm, and more preferably from 25 μm to 80 μm.

<Method for Producing Toner Particle>

Known methods can be used for producing the toner particle. Thus, a kneading pulverization method or a wet production method can be used. From the viewpoint of obtaining uniform particle diameter and shape controllability, the wet production method is preferable. The wet production methods can be exemplified by a suspension polymerization method, a dissolution suspension method, an emulsion polymerization aggregation method, an emulsion aggregation method, and the like.

Here, the suspension polymerization method will be described. The suspension polymerization method may have a step (polymerizable monomer composition preparation step) of preparing a polymerizable monomer composition in which the polymerizable monomer for producing the binder resin, the resin A and the resin B, and, if necessary, other additives such as a colorant are uniformly dissolved or dispersed using a disperser such as a ball mill, an ultrasonic disperser, or the like. At this time, if necessary, a polyfunctional monomer, a chain transfer agent, a wax as a release agent, a charge control agent, a plasticizer, and the like can be added as appropriate.

The polymerizable monomer in the suspension polymerization method can be preferably exemplified by a vinyl-based polymerizable monomer shown below.

Styrene; styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, and the like; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, 2-benzoyloxyethyl acrylate, and the like; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, dibutyl phosphate ethyl methacrylate, and the like; methylene aliphatic monocarboxylic acid esters; vinyl esters such as vinyl acetate, vinyl propionate, vinyl benzoate, vinyl butyrate, vinyl formate, and the like; vinyl ethers such as vinyl methyl ether, vinyl ethyl ether, vinyl isobutyl ether, and the like; vinyl methyl ketone, vinyl hexyl ketone, and vinyl isopropyl ketone.

The suspension polymerization method may include a step in which the polymerizable monomer composition is loaded into an aqueous medium prepared in advance, and a stirrer or a disperser having a high shear force is used to form droplets composed of the polymerizable monomer composition into toner particle of a desired size (granulation step).

The aqueous medium in the granulation step preferably includes a dispersion stabilizer in order to control the particle diameter of the toner particle, sharpen the particle size distribution, and prevent the coalescence of the toner particles in the production process. Dispersion stabilizers are generally classified into polymers that exhibit repulsion due to steric hindrance and poorly water-soluble inorganic compounds that stabilize dispersion by electrostatic repulsion. Fine particles of the poorly water-soluble inorganic compound are preferably used because they are dissolved by an acid or an alkali and, therefore, can be dissolved and easily removed by washing with an acid or an alkali after polymerization.

A dispersion stabilizer of the poorly water-soluble inorganic compound that includes any of magnesium, calcium, barium, zinc, aluminum and phosphorus can be preferably used. It is more preferable that any one of magnesium, calcium, aluminum and phosphorus be included. Specific examples are listed hereinbelow.

Sodium phosphate, magnesium phosphate, tricalcium phosphate, aluminum phosphate, zinc phosphate, magnesium carbonate, calcium carbonate, magnesium hydroxide, calcium hydroxide, aluminum hydroxide, calcium metasilicate, calcium sulfate, barium sulfate, calcium chloride, and hydroxyapatites.

An organic compound such as polyvinyl alcohol, gelatin, methylcellulose, methylhydroxypropylcellulose, ethylcellulose, sodium salt of carboxymethylcellulose, and starch may be used in combination with the dispersion stabilizer.

These dispersion stabilizers are preferably used in an amount from 0.01 parts by mass to 2.00 parts by mass based on 100.00 parts by mass of the polymerizable monomer.

Furthermore, in order to make these dispersion stabilizers finer, a surfactant may be used in combination in an amount from 0.001 part by mass to 0.100 part by mass per 100.000 parts by mass of the polymerizable monomer. Specifically, a commercially available nonionic surfactant, a commercially available anionic surfactant, and a commercially available cationic surfactant can be used. For example, sodium dodecyl sulfate, sodium tetradecyl sulfate, sodium pentadecyl sulfate, sodium octyl sulfate, sodium oleate, sodium laurate, potassium stearate, calcium oleate and the like are preferably used.

In the suspension polymerization method, the temperature is preferably set from 50° C. to 90° C., and the polymerizable monomers contained in the polymerizable monomer composition are polymerized to obtain a toner base particle-dispersed solution (polymerization step). The polymerization step may be performed after the granulation step, or may be performed while performing the granulation step.

In the polymerization step, it is preferable to perform a stirring operation so that the temperature distribution in the container becomes uniform. The addition of a polymerization initiator can be performed at an arbitrary timing and for a required time. In addition, the temperature may be raised in the latter half of the polymerization reaction in order to obtain a desired molecular weight distribution, and further, in order to remove unreacted polymerizable monomers, by-products and the like from the system, a part of the aqueous medium may be distilled off by a distillation operation in the latter half of the reaction, or after completion of the reaction. The distillation operation can be performed under normal pressure or reduced pressure.

An oil-soluble initiator is generally used as the polymerization initiator to be used in the suspension polymerization method. Examples thereof are presented hereinbelow.

Azo compounds such as 2,2'-azobisisobutyronitrile, 2,2'-azobis-2,4-dimethylvaleronitrile, 1,1'-azobis(cyclohexane-1-carbonitrile), 2,2'-azobis-4-methoxy-2,4-dimethylvaleronitrile; and peroxide initiators such as acetylcyclohexylsulfonyl peroxide, diisopropyl peroxycarbonate, decanoyl peroxide, lauroyl peroxide, stearoyl peroxide, propionyl peroxide, acetyl peroxide, tert-butylperoxy-2-ethylhexanoate, benzoyl peroxide, tert-butyl peroxyisobutyrate, cyclohexanone peroxide, methyl ethyl ketone peroxide, dicumyl peroxide, tert-butyl hydroperoxide, di-tert-butyl peroxide, tert-butyl peroxypivalate, and cumene hydroperoxide.

A water-soluble initiator may be used in combination, if necessary, as the polymerization initiator, and examples thereof are listed hereinbelow.

Ammonium persulfate, potassium persulfate, 2,2'-azobis (N,N'-dimethyleneisobutyroamidine) hydrochloride, 2,2'-azobis(2-aminodinopropane) hydrochloride, azobis(isobutylamidine) hydrochloride, sodium 2,2'-azobisisobutyronitrile sulfonate, ferrous sulfate or hydrogen peroxide.

These polymerization initiators can be used singly or in combination of a plurality thereof. In order to control the degree of polymerization of the polymerizable monomers, a chain transfer agent, a polymerization inhibitor and the like can be further used in combination.

Methods for measuring each physical property value are described below.

Method for Isolating Resin A and Resin B From Toner

The resin A and resin B in the toner particle is taken out by separating an extract using tetrahydrofuran (THF) by a solvent gradient elution method. The preparation method is described hereinbelow.

A total of 10.0 g of toner particles are weighed, placed in a cylindrical filter paper (No. 84, manufactured by Toyo Filter Paper Co., Ltd.), and loaded in a Soxhlet extractor. Extraction is performed for 20 h using 200 mL of THF as a solvent, and the solid matter obtained by removing the solvent from the extract is a THF-soluble matter. The resin A and resin B are contained in the THF-soluble matter. The above operations are performed a plurality of times to obtain a required amount of the THF-soluble matter.

Gradient preparative HPLC (LC-20AP high-pressure gradient preparative system manufactured by Shimadzu Corporation, SunFire preparative column 50 mmφ 250 mm manufactured by Waters Co., Ltd.) is used for the solvent gradient elution method. The column temperature is 30° C., the flow rate is 50 mL/min, acetonitrile is used as a poor solvent for the mobile phase, and THF is used as a good solvent.

A solution obtained by dissolving 0.02 g of the THF-soluble matter obtained by the extraction in 1.5 mL of THF is used as a sample for separation. The mobile phase starts with a composition of 100% acetonitrile, and after 5 min from the sample injection, the ratio of THF is increased by 4% every minute, and the composition of the mobile phase is made 100% THF over 25 min. The components can be separated by drying the obtained fraction.

Thereby, the resin A and the resin B can be separately isolated. Which fraction component is the resin A or the resin B can be determined by measuring the amount of silicon atoms and $^{13}$C-NMR measurement described hereinbelow.

Method for Measuring the Amount of Silicon Atoms in Resin A

The measurement of the content of silicon in the resin A is performed by using a wavelength-dispersive X-ray fluorescence spectrometer "Axios" (manufactured by PANalytical) and dedicated software "SuperQ ver. 4.0F" (manufactured by PANalytical) for setting measurement conditions and analyzing measurement data. Rh is used as the anode of the X-ray tube, the measurement atmosphere is vacuum, the measurement diameter (collimator mask diameter) is 27 mm, and the measurement time is 10 sec. When a light element is measured, a proportional counter (PC) is used for detection, and when a heavy element is measured, a scintillation counter (SC) is used for detection.

Further, $SiO_2$ particles (hydrophobic fumed silica) [trade name: AEROSIL NAX50, specific surface area: 40±10 $m^2/g$, carbon content: from 0.45% to 0.85%; manufactured by Nippon Aerosil Co., Ltd.) were added to constitute 0.5 parts by mass with respect to 100.0 parts by mass binder particles [trade name: Spectro Blend, components: C 81.0% by mass, 0 2.9% by mass, H 13.5% by mass, N 2.6% by mass, chemical formula: $C_{19}H38ON$, shape: powder (44 μm); manufactured by Rigaku Corp.], followed by sufficient mixing using a coffee mill. Similarly, the $SiO_2$ particles are mixed with the binder particles so as to constitute 5.0 parts by mass and 10.0 parts by mass, respectively, and these are used as samples for a calibration curve.

For each sample, a pellet for a calibration curve sample is prepared as described below using the tablet molding compressor, and the count rate (unit: cps) of the Si—$K_\alpha$ rays observed at the diffraction angle $(2_\theta)=109.08°$ when PET is used for a spectral crystal is measured. At this time, the acceleration voltage and the current value of the X-ray generator are set to 24 kV and 100 mA, respectively. A calibration curve of a linear function is obtained in which the obtained X-ray count rate is plotted on the ordinate and the addition amount of $SiO_2$ particles in each calibration curve sample is plotted on the horizontal axis.

A pellet obtained by placing 4 g of the resin A in a special aluminum ring for pressing, flattening the resin, and molding to a thickness of 2 mm and a diameter of 39 mm by pressurizing at 20 MPa for 60 sec by using a tablet molding compressor "BRE-32" (manufactured by Maekawa Testing Machine Mfg. Co., Ltd.) is used as a measurement sample.

The count rate of Si—$K_\alpha$ rays of the pellet is measured. Then, the amount of silicon atoms in the resin A is determined from the above calibration curve.

Analysis Method of Copolymer Composition Ratio of Resin A and Resin B

The structures of resin A and resin B are determined using the following devices.

$^1$H NMR: ECA-400 manufactured by JEOL Ltd. (solvent used: deuterated chloroform)

$^{13}$C NMR: FT-NMR AVANCE-600 manufactured by Bruker Biospin Co., Ltd. (solvent used: deuterated chloroform)

$^{13}$C NMR is quantified by a reverse gate decoupling method using chromium (III) acetylacetonate as a buffer reagent, and the composition is analyzed.

Identification of Structures of Resin A and Resin B

The structures of the resin A and the resin B, for example, the polymer segments $P^1$, $L^1$, segments $R^1$ to $R^3$, and the like in the structure represented by the formula (1), are identified using $^1$H-NMR analysis, $^{13}$C-NMR analysis, $^{29}$Si-NMR analysis, and FT-IR analysis.

When $L^1$ includes an amide bond as represented by the above formula (2), the identification can be performed by $^1$H-NMR analysis. Specifically, the identification can be performed by the chemical shift value of the proton of NH segment of the amide group, and the amide group can be quantified by calculating the integral value.

Further, when $R^1$ to $R^3$ in the structure represented by the formula (1) include an alkoxy group or a hydroxy group, the valence of the alkoxy group or the hydroxy group with respect to the silicon atom can be determined by $^{29}$Si-NMR.

<Method for Measuring Weight Average Molecular Weight (Mw)>

The weight average molecular weight (Mw) of the resin is measured by gel permeation chromatography (GPC) in the following manner.

First, the sample is dissolved in tetrahydrofuran (THF) at room temperature for 24 h. Then, the obtained solution is filtered through a solvent-resistant membrane filter "Mysyori Disc" (manufactured by Tosoh Corporation) having a pore diameter of 0.2 μm to obtain a sample solution. The sample solution is prepared so that the concentration of the components soluble in THF is 0.8% by mass. Using this sample solution, measurement is performed under the following conditions.

Device: HLC8120 GPC (detector: RI) (manufactured by Tosoh Corporation)

Column: seven columns of Shodex KF-801, 802, 803, 804, 805, 806, and 807 (manufactured by Showa Denko KK)

Eluent: tetrahydrofuran (THF)

Flow rate: 1.0 mL/min

Oven temperature: 40.0° C.

Sample injection volume: 0.10 mL

In calculating the molecular weight of the sample, a molecular weight calibration curve created using a standard polystyrene resin (trade name "TSK Standard Polystyrene F-850, F-450, F-288, F-128, F-80, F-40, F-20, F-10, F-4, F-2, F-1, A-5000, A-2500, A-1000, A-500 ", manufactured by Tosoh Corporation) is used.

<Method for Measuring Resin Acid Value Av>

The acid value is the number of milligrams of potassium hydroxide required to neutralize the acid contained in 1 g of the sample. The acid value of the resin is measured according to JIS K 0070-1992. Specifically, the acid value is measured according to the following procedure.

(1) Preparation of Reagent

A total of 1.0 g of phenolphthalein is dissolved in 90 mL of ethyl alcohol (95% by volume), and ion exchanged water is added to make 100 mL and obtain a phenolphthalein solution.

A total of 7 g of special grade potassium hydroxide is dissolved in 5 mL of water and ethyl alcohol (95% by volume) is added to make 1 L. The solution is placed in an alkali-resistant container and allowed to stand for 3 days so as not to be exposed to carbon dioxide gas and the like, and then filtered to obtain a potassium hydroxide solution. The obtained potassium hydroxide solution is stored in an alkali-resistant container.

A total of 25 mL of 0.1 mol/L hydrochloric acid is placed in an Erlenmeyer flask, several drops of the phenolphthalein solution are added, titration is performed with the potassium hydroxide solution, and the factor of the potassium hydroxide solution is determined from the amount of the potassium hydroxide solution required for neutralization. The 0.1 mol/L hydrochloric acid prepared according to JIS K 8001-1998 is used.

(2) Operation (A) Main Test

A total of 2.0 g of pulverized sample is precisely weighed in a 200 ml Erlenmeyer flask, 100 ml of a mixed solution of toluene/ethanol (2:1) is added, and dissolution is performed for 5 h. Next, several drops of the phenolphthalein solution are added as an indicator, and titration is performed using the potassium hydroxide solution. The end point of the titration is when the light red color of the indicator continues for about 30 sec.

(B) Blank Test

The same titration as in the above procedure is performed except that no sample is used (that is, only a mixed solution of toluene/ethanol (2:1) is used).

(3) The obtained result is substituted into the following equation to calculate the acid value.

$$A=[(C-B)\times f\times 5.61]/S$$

Here, A: acid value (mg KOH/g), B: addition amount (ml) of the potassium hydroxide solution in the blank test, C: addition amount (ml) of the potassium hydroxide solution in the main test, f: potassium hydroxide solution factor, and S: mass (g) of the sample.

<Method for Measuring Hydroxyl Value OHv of Resin>

The hydroxyl value is the number of milligrams of potassium hydroxide required to neutralize acetic acid bonded to a hydroxy group when acetylating 1 g of a sample. The hydroxyl value of the resin is measured according to JIS K 0070-1992. Specifically, the hydroxyl value is measured according to the following procedure.

(1) Preparation of Reagent

A total of 25 g of special grade acetic anhydride is put into a 100 mL volumetric flask, pyridine is added to make the total volume 100 mL, and thorough shaking is performed to obtain an acetylating reagent. The obtained acetylating reagent is stored in a brown bottle to prevent exposure to moisture, carbon dioxide gas and the like.

A total of 1.0 g of phenolphthalein is dissolved in 90 mL of ethyl alcohol (95% by volume), and ion exchanged water is added to make 100 mL to obtain a phenolphthalein solution.

A total of 35 g of special grade potassium hydroxide is dissolved in 20 mL of water, and ethyl alcohol (95% by volume) is added to make 1 L. The solution is placed in an alkali-resistant container and allowed to stand for 3 days so as not to be exposed to carbon dioxide gas and the like, and then filtered to obtain a potassium hydroxide solution. The obtained potassium hydroxide solution is stored in an alkali-resistant container.

A total of 25 mL of 0.5 mol/L hydrochloric acid is placed in an Erlenmeyer flask, several drops of the phenolphthalein solution are added, titration is performed with the potassium hydroxide solution, and the factor of the potassium hydroxide solution is determined from the amount of the potassium hydroxide solution required for neutralization. The 0.5 mol/L hydrochloric acid prepared according to JIS K 8001-1998 is used.

(2) Operation (A) Main test

A total of 1.0 g of pulverized sample is precisely weighed in a 200 ml round bottom flask, and 5.0 mL of the acetylating reagent is accurately added thereto using a whole pipette. At this time, when the sample is difficult to dissolve in the acetylation reagent, a small amount of special grade toluene is added and dissolved.

A small funnel is placed on the mouth of the flask, the flask is immersed to about 1 cm from the bottom in a glycerin bath at about 97° C. and heated. At this time, in order to prevent the temperature of the neck of the flask from rising due to the heat of the bath, it is preferable to cover the base of the neck of the flask with cardboard having a round hole.

After 1 h, the flask is removed from the glycerin bath and allowed to cool. After cooling, 1 mL of water is added from the funnel and the flask is shaken to hydrolyze acetic anhydride. The flask is again heated in the glycerin bath for 10 min for more complete hydrolysis. After allowing to cool, the funnel and flask walls are washed with 5 mL of ethyl alcohol.

Several drops of the phenolphthalein solution as an indicator are added and titration is performed with the potassium hydroxide solution. The end point of the titration is when the light red color of the indicator continues for about 30 sec.

(B) Blank test

The same titration as in the above procedure is performed except that no sample is used.

(3) The obtained result is substituted into the following equation to calculate the hydroxyl value.

$$A=[\{(B-C)\times 28.05\times f\}/S]+D$$

Here, A: hydroxyl value (mg KOH/g), B: addition amount (mL) of the potassium hydroxide solution in the blank test, C: addition amount (mL) of the potassium hydroxide solution in the main test, f: potassium hydroxide solution factor, S: mass (g) of the sample, and D: acid value of the sample (mg KOH/g).

Method for Measuring Tg

The glass transition temperature (Tg) of the resin A, resin B or binder resin is measured according to ASTM D3418-82 using a differential scanning calorimeter "Q2000" (manufactured by TA Instruments).

The resin A, resin B, or the binder resin that is accurately weighed to 2 mg is used as a measurement sample. The resin is placed in an aluminum pan, and an empty aluminum pan is used as a reference.

The measurement temperature range is set to from 30° C. to 200° C., the temperature is raised from 30° C. to 200° C. at a temperature rise rate of 10° C./min, then lowered from 200° C. to 30° C. at a temperature lowering rate of 10° C./min, and then again raised from 30° C. to 200° C. at a temperature rise rate of 10° C./min. In the DSC curve obtained in the second temperature rise process, the intersection of the line passing through the midpoint of a baseline before and after the specific heat change and the differential thermal curve is taken as the glass transition temperature Tg.

EXAMPLES

Hereinafter, the present disclosure will be specifically described with reference to Examples, but the present disclosure is not limited to these Examples. All parts in Examples and Comparative Examples are based on mass unless otherwise specified.

<Synthesis of Styrene Acrylic Resin (R-1)>

A styrene acrylic resin (R-1) was synthesized in the following manner.

A total of 100.0 parts of propylene glycol monomethyl ether was heated while replacing with nitrogen, and refluxed at a liquid temperature of 120° C. or higher. Thereto, 80.2 parts of styrene, 20.1 parts of butyl acrylate, 5.0 parts of acrylic acid, and 1.0 part of tert-butyl peroxybenzoate [organic peroxide-based polymerization initiator, manufactured by NOF Corporation, trade name: PERBUTYL Z] were added dropwise over 3 h.

After completion of the dropwise addition, the solution was stirred for 3 h, and then distilled under normal pressure while increasing the temperature of the solution to 170° C. After the liquid temperature reached 170° C., the pressure was reduced to 1 hPa, and the solvent was removed by distillation over 1 h to obtain a resin solid matter. The resin solid matter was dissolved in tetrahydrofuran and reprecipitated with n-hexane, and the precipitated solid matter was separated by filtration to obtain a styrene acrylic resin (R-1).

The acid value of the obtained styrene acrylic resin (R-1) was 36.6 mg KOH/g and Mw=22000.

<Synthesis of Styrene Acrylic Resin (R-2)>

Styrene acrylic resin (R-2) was synthesized in the following manner.

A total of 100.0 parts of propylene glycol monomethyl ether was heated while replacing with nitrogen, and refluxed at a liquid temperature of 120° C. or higher. Thereto, 72.9 parts of styrene, 21.6 parts of acrylic acid, and 1.0 part of tert-butyl peroxybenzoate [organic peroxide-based polymerization initiator, manufactured by NOF Corporation, trade name: PERBUTYL Z] were added dropwise over 3 h.

After completion of the dropwise addition, the solution was stirred for 3 h, and then distilled under normal pressure while increasing the temperature of the solution to 170° C. After the liquid temperature reached 170° C., the pressure was reduced to 1 hPa, and the solvent was removed by distillation over 1 h to obtain a resin solid matter. The resin solid matter was dissolved in tetrahydrofuran and reprecipitated with n-hexane, and the precipitated solid matter was separated by filtration to obtain a styrene acrylic resin (R-2).

The acid value of the obtained styrene acrylic resin (R-2) was 154.6 mg KOH/g and Mw=22000.

<Synthesis of Acrylic Resin (R-3)>

Acrylic resin (R-3) was synthesized in the following manner.

A total of 100.0 parts of propylene glycol monomethyl ether was heated while replacing with nitrogen, and refluxed at a liquid temperature of 120° C. or higher. Thereto, 30.0 parts of methyl methacrylate, 50.4 parts of acrylic acid, and 1.0 part of tert-butyl peroxybenzoate [organic peroxide-based polymerization initiator, manufactured by NOF Corporation, trade name: PERBUTYL Z] were added dropwise over 3 h.

After completion of the dropwise addition, the solution was stirred for 3 h, and then distilled under normal pressure while increasing the temperature of the solution to 170° C. After the liquid temperature reached 170° C., the pressure was reduced to 1 hPa, and the solvent was removed by distillation over 1 h to obtain a resin solid matter. The resin solid matter was dissolved in tetrahydrofuran and reprecipitated with n-hexane, and the precipitated solid matter was separated by filtration to obtain a styrene acrylic resin (R-3).

The acid value of the obtained styrene acrylic resin (R-3) was 351.8 mg KOH/g and Mw=8700.

<Synthesis of Polyester (R-4)>

Polyester (R-4) was synthesized by the following procedure.

The following materials were loaded into an autoclave equipped with a decompression device, a water separation device, a nitrogen gas introduction device, a temperature measurement device, and a stirring device, and the reaction was conducted at 200° C. for 5 h under a nitrogen atmosphere at normal pressure.

Bisphenol A-propylene oxide 2.1 mol adduct: 39.6 parts

Terephthalic acid: 8.0 parts

Isophthalic acid: 7.6 parts

Tetrabutoxytitanate: 0.1 part

Thereafter, 0.01 parts of trimellitic acid and 0.12 parts of tetrabutoxytitanate were added, reacted at 220° C. for 3 h, and further reacted under reduced pressure of 10 mmHg to 20 mmHg for 2 h to obtain a polyester (R-4).

The obtained polyester (R-4) had an acid value of 6.1 mg KOH/g, a hydroxyl value of 33.6 mg KOH/g, and Mw=10200.

Synthesis of Polyester (R-5)

A polyester (R-5) was synthesized by the following procedure.

The following materials were placed in an autoclave equipped with a decompression device, a water separator, a nitrogen gas introduction device, a temperature measuring device, and a stirring device, and the reaction was carried out under a nitrogen atmosphere at normal pressure and 200° C. for 5 hours.

Bisphenol A-propylene oxide 2 mol adduct: 21.0 parts

Ethylene glycol: 2.1 parts

Isosorbide: 0.6 parts

Terephthalic acid: 14.8 parts

Tetrabutoxytitanate: 0.1 parts

Then, 1.1 part of trimellitic acid and 0.1 part of tetrabutoxytitanate were added and reacted at 220° C. for 3 hours, and further reacted under reduced pressure of from 10 mmHg to 20 mmHg for 2 hours to obtain a polyester (R-5).

The acid value of the obtained polyester (R-5) was 6.0 mgKOH/g, the hydroxyl value was 32.4 mgKOH/g, and the Mw was 10400.

Synthesis of Polyester (R-6)

Polylactic acid [(polyester (R-6)] was synthesized by the following procedure.

The following materials were placed in an autoclave equipped with a decompression device, a water separator, a nitrogen gas introduction device, a temperature measuring device, and a stirring device, and the reaction was carried out under a nitrogen atmosphere at normal pressure and 200° C. for 5 hours.

Lactic acid: 100.0 parts

Tetrabutoxytitanate: 0.1 parts

After that, 0.1 part of tetrabutoxytitanate was added, and the reaction was carried out at 220° C. for 3 hours, and further under reduced pressure of from 10 mmHg to 20 mmHg for 2 hours. The obtained resin was dissolved in chloroform, and the solution was added dropwise to ethanol, reprecipitated and filtered to obtain a polyester (R-6).

The acid value of the obtained polyester (R-6) was 3.5 mgKOH/g and the Mw was 30000.

Synthesis of Polyester (R-7)

A polyester (R-7) was obtained in the same manner as in the synthesis of the polyester (R-4), except that 39.6 parts of bisphenol A-propylene oxide 2.1 mol adduct was changed to 33.2 parts of bisphenol A-ethylene oxide 2 mol adduct.

The acid value of the obtained polyester (R-7) was 5.8 mgKOH/g, the hydroxyl value was 34.3 mgKOH/g, and the Mw was 10800.

Synthesis of Polyester (R-8)

Poly-ε-caprolactone [(polyester (A-8)] with a stearyl ester as carboxylic acid terminal was synthesized by the following procedure.

The following materials were placed in a reaction vessel equipped with a nitrogen gas introduction device, a temperature measuring device, and a stirring device, and the reaction was carried out at 100° C. for 5 hours in a nitrogen atmosphere.

Stearyl alcohol: 3.0 parts

ε-Caprolactone: 38.2 parts

Titanium (IV) tetraisopropoxide: 0.5 parts

The obtained resin was dissolved in chloroform, the solution was added dropwise to methanol, reprecipitated and filtered to obtain a polyester (R-8).

The acid value of the obtained polyester (R-8) was 0.0 mgKOH/g, the hydroxyl value was 30.3 mgKOH/g, and the Mw was 8300.

Synthesis of Polyesters (R-9) and (R-10)

Polyesters (R-9) and (R-10) were synthesized in the same manner as in the synthesis of the polyester (R-4), except that the reaction pressure, reaction temperature, and reaction time were adjusted so as to obtain the target molecular weight.

Table 1 shows the physical characteristics of the obtained polyesters (R-9) and (R-10).

Production Example of Resin A

Production Example of Resin (A-1)

A resin (A-1) represented by the formula (1) was produced by the following procedure.

A total of 50.0 parts of styrene acrylic resin (R-1) was dissolved in 200.0 parts of N,N-dimethylacetamide, 7.1 parts of 3-aminopropyltriethoxysilane as a silane compound and 9.8 parts of DMT-MM [4-(4,6-dimethoxy-1,3,5-triazine-2-yl)-4-methylmorpholinium chloride] as a condensing agent were added, and stirring was performed at room temperature for 5 hours. After completion of the reaction, this solution was added dropwise to methanol, reprecipitated and filtered to obtain a resin (A-1). Table 2 shows the physical characteristics of the obtained resin.

Production Examples of Resins (A-2) to (A-6) and (A-10) to (A-16)

Resins (A-2) to (A-6) and (A-10) to (A-16) were obtained in the same manner as in the production example of the resin (A-1), except that the type of the base raw material resin; the type and addition amount of the modified silane compound; and the addition amount of DMT-MM were changed as shown in Table 1. Table 2 shows the physical characteristics of these obtained resins.

Production Example of Resin (A-9)

A solution of 10.0 parts of resin (A-4) dissolved in 90.0 parts of toluene was mixed and stirred with 400.0 parts of pure water, the pH was adjusted to 4.0 with dilute hydrochloric acid, stirring was conducted for 10.8 hours at normal temperature and then the stirring was stopped and the mixture was transferred to a liquid separation funnel to extract the oil phase. The oil phase was concentrated and reprecipitated with methanol to obtain a resin (A-9) represented by the formula (1).

When the obtained resin (A-9) was analyzed by $^{29}$Si-NMR measurement, all of $R^1$ to $R^3$ in the formula (1) were hydroxy groups.

Production Example of Resin (A-7)

A resin A (A-7) in which a linking group represented by the formula (4) or the formula (5) was formed by an insertion reaction with an epoxy group in the epoxy silane with respect to the ester bond in the polyester (R-7) was synthesized in the following manner.

A total of 50.0 parts of polyester (R-7) was dissolved in 100.0 parts of anisole, 12.2 parts of (3-glycidoxypropyl)trimethoxysilane and 10.0 parts of tetrabutylphosphonium bromide were added, and heating and stirring were performed at about 140° C. for 5 hours in a nitrogen atmosphere. After being allowed to cool, the reaction mixture was as dissolved in 200 ml of chloroform, added dropwise to methanol, reprecipitated and filtered to obtain a resin A (A-7). Table 2 shows the physical characteristics of the obtained resin.

Production Example of Resin (A-8)

A resin A (A-8) having a urethane bond formed by reacting a hydroxy group in the polyester (R-8) with an isocyanate group in isocyanate silane was synthesized in the following manner.

A total of 50.0 parts of polyester (R-8) was dissolved in 500.0 parts of chloroform, 6.6 parts of 3-isocyanatepropyltriethoxysilane and 0.5 parts of titanium (IV) tetraisopropoxide were added under a nitrogen atmosphere, and stirring was performed at normal temperature for 5 hours. After completion of the reaction, this solution was added dropwise to methanol, reprecipitated and filtered to obtain a resin A (A-8). Table 2 shows the physical characteristics of the obtained resin.

Production Example of Resin (A-17)

Diphenylmethane diisocyanate (MDI): 41.3 parts

Bisphenol A-ethylene oxide 2 mol adduct (BPA-2E0): 33.8 parts

Tetrahydrofuran (THF): 300.0 parts

The above materials were loaded in a reaction vessel equipped with a stirrer and a thermometer while purging with nitrogen. After heating to 50° C. and carrying out a urethanization reaction for 8 hours, 1.0 part of 3-isocyanatepropyltriethoxysilane was added and the reaction was further carried out for 8 hours, 3.0 parts of t-butyl alcohol was added, and an isocyanate terminal was modified. THF, which was a solvent, was distilled off to obtain a resin (A-17).

TABLE 1

Synthesis of resin A

| Resin A No. | Base raw material resin | | | Modified silane compound | | Condensing agent (DMT-MM) |
|---|---|---|---|---|---|---|
| | No. | Weight average molecular weight (Mw) | Acid value mgKOH/g | Hydroxyl value mgKOH/g | type | Addition amount (parts) | Addition amount (parts) |

| Resin A No. | No. | Mw | Acid value | Hydroxyl value | type | Addition amount | Addition amount |
|---|---|---|---|---|---|---|---|
| A-1 | R-1 | 22000 | 36.6 | — | 3-aminopropyltriethoxysilane | 7.1 | 9.8 |
| A-2 | R-2 | 22000 | 154.6 | — | 3-aminopropyltriethoxysilane | 30.4 | 41.8 |
| A-3 | R-3 | 8700 | 351.8 | — | 3-aminopropyltriethoxysilane | 60.9 | 83.8 |
| A-4 | R-4 | 10200 | 6.1 | 33.6 | 3-aminopropyltriethoxysilane | 1.2 | 1.7 |
| A-5 | R-5 | 10400 | 6.0 | 32.4 | 3-aminopropyltriethoxysilane | 1.1 | 1.6 |
| A-6 | R-6 | 30000 | 3.5 | — | 3-aminopropyltriethoxysilane | 0.7 | 0.9 |
| A-7 | R-7 | 10800 | 5.8 | 34.3 | 3-(glycidoxypropyl)trimethoxysilane | 12.2 | — |
| A-8 | R-8 | 8300 | 0.0 | 30.3 | 3-isocyanatopropyltriethoxysilane | 6.6 | — |
| A-9 | R-4 | 10200 | 6.1 | 33.6 | 3-aminopropyltriethoxysilane | 1.2 | 1.7 |
| A-10 | R-4 | 10200 | 6.1 | 33.6 | 3-aminopropylmethyldiethoxysilane | 1 | 1.7 |
| A-11 | R-4 | 10200 | 6.1 | 33.6 | 3-aminopropylsilicon | 0.5 | 1.7 |
| A-12 | R-9 | 99600 | 0.2 | 30.4 | 3-aminopropyltriethoxysilane | 0.03 | 0.04 |
| A-13 | R-10 | 1800 | 30.9 | 14.2 | 3-aminopropyltriethoxysilane | 6.1 | 8.4 |
| A-14 | R-9 | 99600 | 0.2 | 30.4 | 3-aminopropyltriethoxysilane | 0.015 | 0.02 |
| A-15 | R-3 | 8700 | 351.8 | — | 3-aminopropyltriethoxysilane | 69.2 | 95.2 |
| A-16 | R-10 | 1800 | 30.9 | 14.2 | 3-aminopropyltriethoxysilane | 3.1 | 4.2 |
| A-17 | Described in the description | | | | | | |

TABLE 2

Physical characteristics of resin A

| Resin A No. | $P^1$ | $R^1$ | $R^2$ | $R^3$ | $L^1$ | $R^5$ | $R^6$ | $R^7$ or $R^8$ | Weight average molecular weight (Mw) | *1 | Tg(A) (° C.) |
|---|---|---|---|---|---|---|---|---|---|---|---|
| A-1 | R-1 | OEt | OEt | OEt | Formula (2) | —$C_3H_6$— | | | 25800 | 1.14 | 65 |
| A-2 | R-2 | OEt | OEt | OEt | Formula (2) | —$C_3H_6$— | | | 34700 | 4.78 | 84 |
| A-3 | R-3 | OEt | OEt | OEt | Formula (2) | —$C_3H_6$— | | | 21900 | 9.80 | 90 |
| A-4 | R-4 | OEt | OEt | OEt | Formula (2) | —$C_3H_6$— | | | 11300 | 0.22 | 64 |
| A-5 | R-5 | OEt | OEt | OEt | Formula (2) | —$C_3H_6$— | | | 10500 | 0.22 | 64 |
| A-6 | R-6 | OEt | OEt | OEt | Formula (2) | —$C_3H_6$— | | | 30500 | 0.20 | 68 |
| A-7 | R-7 | OMe | OMe | OMe | Formula (4) or (5) | | | —$CH_2$—O—$C_3H_6$— | 16100 | 1.91 | 62 |
| A-8 | R-8 | OEt | OEt | OEt | Formula (3) | | —$C_3H_6$— | | 8400 | 0.97 | 61 |
| A-9 | R-4 | OH | OH | OH | Formula (2) | —$C_3H_6$— | | | 13000 | 0.20 | 68 |
| A-10 | R-4 | OEt | OEt | Me | Formula (2) | —$C_3H_6$— | | | 13400 | 0.19 | 58 |
| A-11 | R-4 | H | H | H | Formula (2) | —$C_3H_6$— | | | 11400 | 0.28 | 55 |
| A-12 | R-9 | OEt | OEt | OEt | Formula (2) | —$C_3H_6$— | | | 99700 | 0.02 | 60 |
| A-13 | R-10 | OEt | OEt | OEt | Formula (2) | —$C_3H_6$— | | | 3200 | 0.95 | 52 |
| A-14 | R-9 | OEt | OEt | OEt | Formula (2) | —$C_3H_6$— | | | 100800 | 0.01 | 68 |
| A-15 | R-3 | OEt | OEt | OEt | Formula (2) | —$C_3H_6$— | | | 21900 | 10.80 | 70 |
| A-16 | R-10 | OEt | OEt | OEt | Formula (2) | —$C_3H_6$— | | | 2500 | 0.48 | 52 |
| A-17 | Polyurethane | OEt | OEt | OEt | Formula (3) | | —$C_3H_6$— | | 23500 | 0.32 | 58 |

*1: Amount of silicon atoms in resin A (% by mass)

Production Example of Resin B

Synthesis Example of Compound (16) Including Azo Group

A compound (16) including an azo group was obtained according to the following scheme.

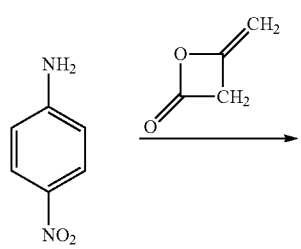

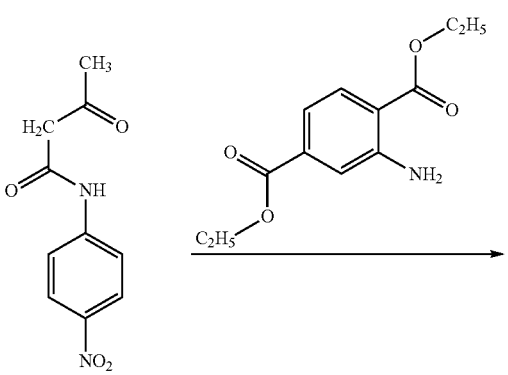

(14)

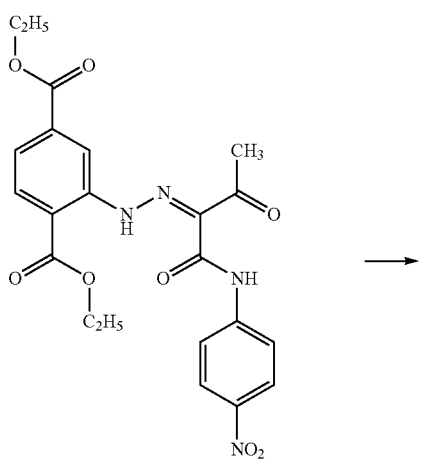

(15)

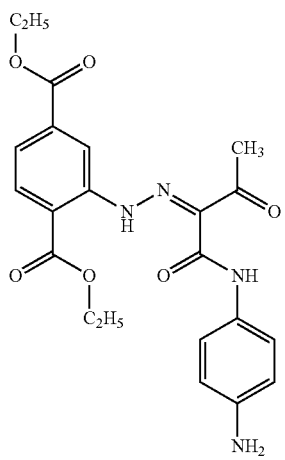

(16)

First, 3.1 parts of 4-nitroaniline (manufactured by Tokyo Chemical Industry Co., Ltd.) was added to 30.0 parts of chloroform, ice cooling was performed to 10° C. or lower, and 1.9 parts of diketene (manufactured by Tokyo Chemical Industry Co., Ltd.) was added. Then, stirring was performed at 65.0° C. for 2 hours. After completion of the reaction, extraction with chloroform and concentration were performed to obtain a compound of formula (14).

Next, 40.0 parts of methanol and 5.3 parts of concentrated hydrochloric acid were added to 4.3 parts of diethyl 2-aminoterephthalate (manufactured by Merck & Co, Inc.), followed by ice cooling to 10° C. or lower. To this solution, 2.1 parts of sodium nitrite dissolved in 6.0 parts of water was added, and the reaction was conducted at the same temperature for 1 hour.

Next, 1.0 part of sulfamic acid was added, followed by stirring for 20 min (diazonium salt solution). A total of 4.5 parts of the compound of the formula (14) was added to 70.0 parts of methanol, followed by ice cooling to 10° C. or lower and the addition of a diazonium salt solution. Then, 5.8 parts of sodium acetate dissolved in 7.0 parts of water was added, and the reaction was conducted at 10° C. or lower for 2 hours. After completion of the reaction, 300 parts of water was added, stirring was carried out for 30 min, and then the solid was separated by filtration and purified by the recrystallization method from N, N-dimethylformamide to obtain a compound of formula (15).

Next, 8.6 parts of the compound (15) and 0.4 parts of palladium-activated carbon (palladium 5%) were added to 150.0 parts of N, N-dimethylformamide and stirring was performed at 40° C. for 3 hours under a hydrogen gas atmosphere (reaction pressure from 0.1 MPa to 0.4 MPa). After completion of the reaction, the solution was filtered off and concentrated to obtain a compound (16) including an azo group.

Synthesis Example of Compound (17) Including Azo Group

A compound (17) including an azo group was obtained in the same manner as in the synthesis example of the compound (16) including an azo group, except that 4.3 parts of diethyl 2-aminoterephthalate (manufactured by Merck & Co, Inc.) in the synthesis example of compound (16) including an azo group was replaced with 2.8 parts of 3-aminobenzamide (manufactured by Tokyo Chemical Industry Co., Ltd.).

group was replaced with 3.1 parts of 5-amino-2-benzimidazolinone (manufactured by Tokyo Chemical Industry Co., Ltd.).

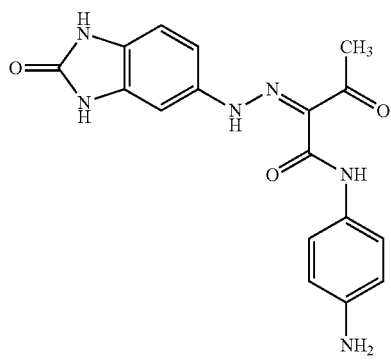

(18)

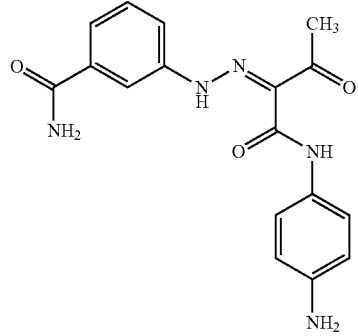

(17)

Synthesis Example of Compound (18) Including Azo Group

A compound (18) including an azo group was obtained in the same manner as in the synthesis example of compound (16) including an azo group, except that 4.3 parts of diethyl 2-aminoterephthalate (manufactured by Merck & Co, Inc.) in the synthesis example of compound (16) including an azo

Synthesis Example of Compound (19) Including Azo Group

A compound (19) including an azo group was obtained in the same manner as in the synthesis example of compound (16) including an azo group, except that 4.3 parts of diethyl 2-aminoterephthalate (manufactured by Merck & Co, Inc.) in the synthesis example of compound (16) including an azo group was replaced with 3.1 parts of (3-aminophenyl) urea (manufactured by Waterstone Technology, LLC).

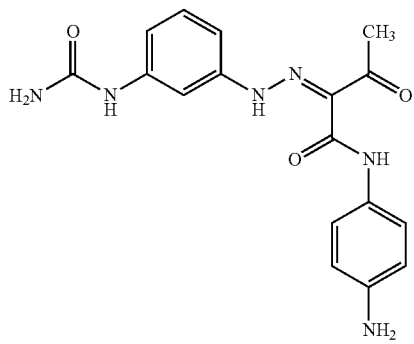

(19)

Production Example of Resin (B-1)

A resin (B-1) was manufactured by the following procedure.

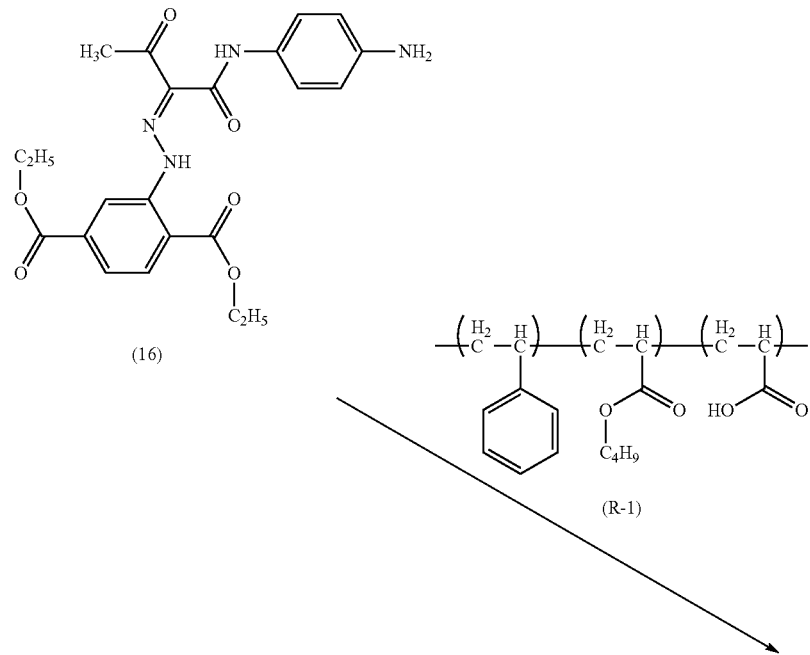

A total of 50.0 parts of styrene acrylic resin (R-1) was dissolved as an "organic resin" in 200.0 parts of N,N-dimethylacetamide, 14.1 parts of the compound of formula (16) as a "compound including an azo group" and 9.8 parts of DMT-MM [4-(4,6-dimethoxy-1,3,5-triazine-2-yl)-4-methylmorpholinium chloride] as a condensing agent were added, and stirring was performed for 5 hours at normal temperature. After completion of the reaction, this solution was added dropwise to methanol, reprecipitated and filtered to obtain a resin (B-1) having an amide bond (—CONH—) as a "linking group".

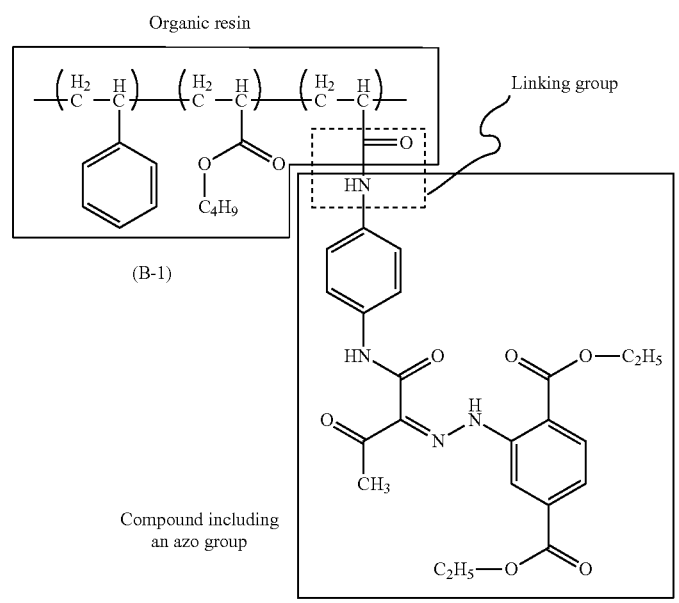

Table 3 shows the physical characteristics of the obtained resin.

Production Examples of Resins (B-2) to (B-6) and Resins (B-8) to (B-12)

Resins (B-2) to (B-6) and resins (B-8) to (B-12) were obtained in the same manner as in the production example of the resin (B-1), except that the type of organic resin; the type and addition amount of the compound including an azo group; and the addition amount of DMT-MM were changed as shown in Table 3 hereinbelow. Table 3 shows the physical characteristics of the obtained resins.

Formulas (20) to (21) in Table 3 represent compounds of the following formulas.

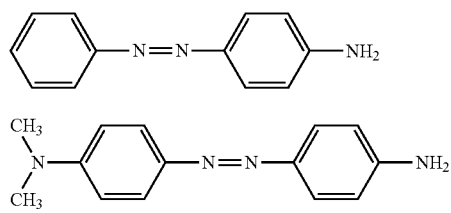

Production Example of Resin (B-7)

A total of 50.0 parts of styrene acrylic resin (R-1) was dissolved as an "organic resin" in 200.0 parts of N,N-dimethylacetamide, 9.3 parts of the compound of formula (22) as a "compound including an azo group", 9.8 parts of DMT-MM [4-(4,6-dimethoxy-1,3,5-triazine-2-yl)-4-methylmorpholinium chloride] as a condensing agent, and 3.9 parts of NMM (N-methyl) morpholine were added, and stirring was performed for 5 hours at normal temperature. After completion of the reaction, this solution was added dropwise to methanol, reprecipitated and filtered to obtain a resin (B-7) having an ester bond (—COO—) as a "linking group".

Table 3 shows the physical characteristics of the obtained resin.

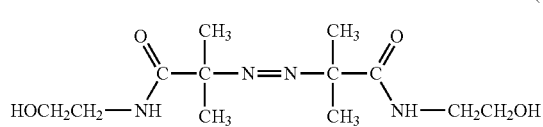

Production Example of Toner Particles 1

Toner particles 1 were produced by the suspension polymerization method in the following manner.
(Production of Aqueous Medium 1)

A total of 390.0 parts of ion exchanged water and 14.0 parts of sodium phosphate (dodecahydrate) (manufactured by Rasa Industries, Ltd.) were loaded into a reaction container, and the temperature was maintained at 65° C. for 1.0 h while purging with nitrogen.

An aqueous solution of calcium chloride obtained by dissolving 9.2 parts of calcium chloride (dihydrate) in 10.0 parts of ion exchanged water was added all at once, while stirring at 12000 rpm by using T. K. HOMOMIXER (manufactured by Tokushu Kika Kogyo Co., Ltd.), to prepare an aqueous medium including a dispersion stabilizer.

Further, 10% hydrochloric acid was added to the aqueous medium to adjust the pH to 6.0, whereby an aqueous medium 1 was obtained.
(Production of Polymerizable Monomer Composition 1)

Styrene: 65.0 parts

Colorant (C. I. Pigment Blue 15:3): 6.5 parts

A dispersion liquid 1 in which the colorant was dispersed was prepared by loading the above materials into an attritor (manufactured by Nippon Coke Industries Co., Ltd.), further loading zirconia particles having a diameter of 1.7 mm, dispersing at 220 rpm for 5.0 hours, and then removing the zirconia particles.

The following materials were added to the dispersion liquid 1.

N-butyl acrylate: 35.0 parts

Resin (A-1): 3.0 parts

Resin (B-1): 3.0 parts

Polyester resin (R-4): 5.0 parts

Fischer-Tropsch wax (melting point: 78° C.): 7.0 parts

The system was kept warm at 65° C., and uniform dissolution and dispersion were performed at 500 rpm with T. K. Homomixer to prepare a polymerizable monomer composition 1.
(Granulation Step)

The polymerizable monomer composition 1 was loaded into the aqueous medium 1 while maintaining the temperature of the aqueous medium 1 at 70° C. and the rotation speed of the stirrer at 12000 rpm, and 9.0 parts of t-butyl

TABLE 3

Physical characteristics of resin B

| Resin including azo group No. | Organic resin No. | Compound including azo group type | Addition amount (parts) | DMT-MM Addition amount (parts) | NMM Addition amount (parts) | Linking group | Mw | Tg(B) (° C.) |
|---|---|---|---|---|---|---|---|---|
| B-1 | R-1 | Formula (16) | 14.1 | 9.8 | | —CONH— | 26400 | 62 |
| B-2 | R-1 | Formula (17) | 10.9 | 9.8 | | —CONH— | 24000 | 63 |
| B-3 | R-1 | Formula (18) | 11.3 | 9.8 | | —CONH— | 23500 | 61 |
| B-4 | R-1 | Formula (19) | 11.4 | 9.8 | | —CONH— | 24600 | 67 |
| B-5 | R-1 | Formula (20) | 6.3 | 9.8 | | —CONH— | 23100 | 63 |
| B-6 | R-1 | Formula (21) | 7.7 | 9.8 | | —CONH— | 23380 | 58 |
| B-7 | R-1 | Formula (22) | 9.3 | 9.8 | 3.9 | —COO— | 23500 | 57 |
| B-8 | R-4 | Formula (18) | 1.9 | 1.7 | | —CONH— | 10800 | 64 |
| B-9 | R-9 | Formula (20) | 0.01 | 0.02 | | —CONH— | 99800 | 63 |
| B-10 | R-10 | Formula (20) | 5.4 | 8.4 | | —CONH— | 3100 | 53 |
| B-11 | R-9 | Formula (20) | 0.03 | 0.04 | | —CONH— | 100700 | 72 |
| B-12 | R-10 | Formula (20) | 2.7 | 4.2 | | —CONH— | 2450 | 52 | peroxypivalate, which is a polymerization initiator, was added. Granulation was carried out for 10 min while maintaining 12000 rpm with the stirring device.

(Polymerization Step)

A high-speed stirrer was changed to a stirrer equipped with a propeller stirring blade, polymerization was performed for 5.0 h while stirring at 150 rpm and maintaining 70° C., and the temperature was further raised to 85° C. and heating was performed for 2.0 h to carry out a polymerization reaction and obtain a toner base particle-dispersed solution 1.

(Washing and Filtration Step)

Then, toner particles 1 were obtained by adjusting the pH to 1.5 with 1 mol/L hydrochloric acid, stirring for 1 hour, filtering while washing with ion-exchanged water, drying the obtained filtered cake at 45° C. for 48 hours in a dryer, and sieving with a mesh having a mesh size of 75 μm.

Production Example of Toner Particles 2 to 12

Toner particles 2 to 12 were obtained in the same manner as in the production example of toner particles 1, except that the resin (B-1) was changed to the resins (B-2) to (B-12).

Production Example of Toner Particles 13 to 28

Toner particles 13 to 28 were obtained in the same manner as in the production example of toner particles 1, except that the resin (A-1) was changed to the resins (A-2) to (A-17).

Production Example of Toner Particles 32

Toner particles 32 were obtained in the same manner as in the production example of toner particles 1, except that 65.0 parts of styrene were changed to 94.0 parts and 35.0 parts of n-butyl acrylate were changed to 6.0 parts in the "Production of Polymerizable Monomer Composition 1".

Production Example of Toner Particles 29

Toner particles 29 were produced by the kneading and pulverizing method in the following manner.

The following materials were loaded into an autoclave, the inside of the system was replaced with nitrogen, and then the temperature was raised and maintained at 180° C. under stirring.
  Low-density polyethylene (melting point 100° C.): 20.0 parts
  Styrene: 64.0 parts
  n-Butyl acrylate: 13.5 parts
  Acrylonitrile: 2.5 parts Subsequently, 50.0 parts of a xylene solution of 2.0% by mass of t-butyl hydroperoxide was continuously added dropwise into the system over 4.5 hours, and after cooling, the solvent was separated and removed to obtain a graft polymer in which a styrene acrylic copolymer was grafted onto polyethylene.
  Styrene/butyl acrylate copolymer: 100.0 parts
  (Copolymerization mass ratio: 70/30, Mw=100,000, Tg=50° C.)
  Resin (A-1): 3.0 parts
  Resin (B-1): 3.0 parts
  Paraffin wax (melting point: 75° C.): 5.0 parts
  Graft polymer: 5.0 parts
  C. I. Pigment Blue 15:3: 5.0 parts The above materials were mixed well with an FM mixer (FM-75 type, manufactured by Nippon Coke Industries Co., Ltd.) and the mixture was melt-kneaded with a twin-screw kneader (PCM-30 type, manufactured by Ikegai Iron Works Co., Ltd.) set to a temperature of 100° C.

The obtained kneaded product was cooled and coarsely pulverized to 1 mm or less with a hammer mill to obtain a coarsely pulverized product.

Next, the obtained coarsely pulverized material was converted into a finely pulverized material by using a turbo mill (T-250: RSS rotor/SNB liner) manufactured by Turbo Industries, Ltd.

After that, fine powder and coarse powder were cut using a multi-division classifier utilizing the Coanda effect to obtain toner particles 29.

Production Example of Toner Particles 30

Toner particles 30 were produced by the dissolution/suspension method in the following manner.

A total of 660.0 parts of ion-exchanged water and 25.0 parts of 48.5% sodium dodecyldiphenyl ether disulfonate aqueous solution were mixed, and the mixture was stirred at 10000 rpm using a T. K. Homomixer to prepare an aqueous medium 2.

The following materials was loaded into 500.0 parts of ethyl acetate and dissolved at 100 rpm with a propeller type stirrer to prepare a solution.
  Styrene/butyl acrylate copolymer: 100.0 parts
  (Copolymerization mass ratio: 70/30, Mw=100,000, Tg=50° C.)
  Resin (A-1): 3.0 parts
  Resin (B-1): 3.0 parts
  Polyester (R-4): 5.0 parts
  Colorant (C. I. Pigment Blue 15:3): 6.5 parts
  Fischer-Tropsch wax (melting point: 78° C.): 9.0 parts A total of 150.0 parts of the aqueous medium 2 was placed in a container and stirred using T. K. HOMOMIXER at a rotation speed of 12,000 rpm, and 100.0 parts of the solution was added thereto and mixed for 10 min to prepare an emulsified slurry.

Thereafter, 100.0 parts of the emulsified slurry was loaded into a flask equipped with a degassing pipe, a stirrer, and a thermometer, and the solvent was removed under reduced pressure at 30° C. for 12 h while stirring at 500 rpm, followed by aging at 45° C. for 4 h. Thus, a desolventized slurry was obtained.

After the desolventized slurry was filtered under reduced pressure, 300.0 parts of ion exchanged water was added to the obtained filter cake, followed by mixing with T. K. HOMOMIXER, re-dispersing (at 12,000 rpm for 10 min) and then filtering.

The obtained filter cake was dried in a dryer at 45° C. for 48 h, and sieved with a mesh having a mesh size of 75 μm to obtain toner particles 30.

Production Example of Toner Particles 31

Toner particles 31 were produced by the emulsification and agglutination method in the following manner.

(Production of Resin Particle-Dispersed Solution)

The following materials were weighed, mixed and dissolved.
  Styrene: 65.0 parts
  N-butyl acrylate: 35.0 parts
  Acrylic acid: 1.3 parts
  Resin (A-1): 3.0 parts
  Resin (B-1): 3.0 parts
  Hexanediol diacrylate: 0.4 parts N-Lauryl mercaptan: 3.2 parts A 10% aqueous solution of NEOGEN RK (manufactured by Daiichi Kogyo Seiyaku Co., Ltd.) was added to the obtained solution and dispersed. An aqueous solution in which 0.15 part of potassium persulfate was dissolved in 10.0 parts of ion exchanged water was added while stirring slowly for another 10 min. After purging with nitrogen, emulsion polymerization was performed at a temperature of 70° C. for 6.0 h. After completion of the polymerization, the reaction solution was cooled to room temperature, and ion exchanged water was added to obtain a resin particle-dispersed solution having a solid fraction concentration of 12.5% and a volume-based median diameter of 0.2 μm.

(Production of Wax Particle-Dispersed Solution)

The following materials were weighed and mixed.

| | |
|---|---|
| Ester wax (melting point: 70° C.) | 100.0 parts |
| NEOGEN RK (manufactured by Daiichi Kogyo Seiyaku Co., Ltd.) | 15.0 parts |
| Ion exchanged water | 385.0 parts |

The above-mentioned materials were dispersed for 1 h using a wet jet mill JN100 (manufactured by Joko Corporation) to obtain a wax particle-dispersed solution. The solid fraction concentration of the wax in the wax particle-dispersed solution was 20.0%.

(Production of Colorant Particle-Dispersed Solution)

The following materials were weighed and mixed.

| | |
|---|---|
| Colorant (C. I. Pigment Blue 15:3) | 100.0 parts |
| NEOGEN RK (manufactured by Daiichi Kogyo Seiyaku Co., Ltd.) | 15.0 parts |
| Ion exchanged water | 885.0 parts |

The above materials were dispersed for 1 h using a wet jet mill JN100 (manufactured by Joko Corporation) to obtain a colorant particle-dispersed solution.

Resin particle-dispersed solution: 160.0 parts

Wax particle-dispersed solution: 10.0 parts

Colorant particle-dispersed solution: 10.0 parts

Magnesium sulfate: 0.2 parts

The above materials were dispersed using a homogenizer (ULTRA-TURRAX T50, manufactured by IKA Co., Ltd.) and then heated to 65° C. under stirring. The mixture was stirred as it was for 1.0 hours.

A total of 2.2 parts of Neogen RK (manufactured by Daiichi Kogyo Seiyaku Co., Ltd.) was added to the mixture, the temperature was raised to 80° C., and stirring was performed for 2.0 hours to obtain fused spherical toner base particles.

Cooling was followed by filtration and the filtered solid was stirred and washed with 720.0 parts of ion-exchanged water for 1.0 hours. The solution containing the toner particles was filtered and dried using a vacuum dryer to obtain toner particles 31.

Production Example of Comparative Toner Particles 1

Assuming the technique described in Japanese Patent Application Publication No. H07-239573, the Tg of the binder resin was reduced in order to further improve low-temperature fixability.

Specifically, comparative toner particles 1 were obtained in the same manner as in the production example of toner particles 1, except that the resin (B-1) was not added.

Production Example of Comparative Toner Particles 2

Comparative toner particles 2 were obtained in the same manner as in the production example of toner particles 1, except that the resin (A-1) was not added.

Production Example of Comparative Toner Particles 3

In order to verify the case where the resin B is a "small molecule having an azo group" rather than a "resin having an azo group", comparative toner particles 3 were obtained in the same manner as in the production example of toner particles 1, except that the resin (B-1) was changed to the compound shown in the formula (20).

Production Example of Comparative Toner Particles 4

In order to verify the case where the resin A is a "small molecule having a silyl group" rather than a "resin having a silyl group", comparative toner particles 4 were obtained in the same manner as in the production example of toner particles 1, except that the resin (A-1) was changed to "3-aminopropyltriethoxysilane".

Production Example of Comparative Toner Particles 5

In order to verify the case where there is no silyl group in the resin A, comparative toner particles 5 were obtained in the same manner as in the production example of toner particles 1, except that the resin (A-1) was changed to the styrene acrylic resin (R-1).

Production Example of Toner 1

A total of 100 parts of toner particles 1 and 0.6 parts of hydrophobic silica fine particles having a BET value of 200 $m^2/g$ and a number average particle diameter of primary particles of of 8 nm were mixed with a Henschel mixer (manufactured by Mitsui Miike Machinery Co., Ltd.) to obtain a toner 1.

Production Examples of Toners 2 to 32 and Comparative Toners 1 to 5

Toners 2 to 32 and comparative toners 1 to 5 were obtained in the same manner as in the production example of toner 1, except that the toner particles 1 were changed to tone particles 2 to 32 and comparative toner particles 1 to 5.

Examples 1 to 32 and Comparative Examples 1 to 5

Methods for evaluating each of the toners 1 to 32 and comparative toners 1 to 5 will be described below. The evaluation results are shown in Table 4.

Heat-Resistant Storage Stability

A total of 5.0 g of the toner was placed in a 100 ml resin cup and allowed to stand at a temperature of 50° C. and a humidity of 10% RH for 10 days, and the degree of toner aggregation was thereafter measured and evaluated according to the following criteria.

A measuring device in which a digital display type vibrometer "DigiVibro MODEL 1332A" (manufactured by Showa Sokki Co., Ltd.) was connected to the side surface of a shaking table of a "Powder Tester" (manufactured by Hosokawa Micron Corporation) was used. Then, a sieve having a mesh size of 38 μm (400 mesh), a sieve having a mesh size of 75 μm (200 mesh), and a sieve having a mesh size of 150 μm (100 mesh) were stacked and set on the shaking table of the powder tester in this order from the bottom. The measurement was carried out in the environment of 23° C. and 60% RH in the following manner.
(1) The vibration width of the shaking table was adjusted in advance so that the displacement value of the digital display type vibrometer was 0.60 mm (peak-to-peak).
(2) A total of 5 g of the toner that was allowed to stand was precisely weighed and gently placed on a sieve having an opening of 150 μm on the uppermost stage.
(3) After vibrating the sieve for 15 sec, the mass of the toner remaining on each sieve was measured, and the degree of aggregation was calculated based on the following formula.

Degree of aggregation (%)={(sample mass (g) on a sieve with a mesh size of 150 μm)/5 (g)}×100+ {(sample mass (g) on a sieve with a mesh size of 75 μm)/5 (g)}×100×0.6+{(sample mass (g) on a sieve with a mesh size of 38 μm)/5 (g)}× 100×0.2.

The evaluation criteria are as follows.
A: Degree of aggregation is less than 20%.
B: Degree of aggregation is 20% or more and less than 25%.
C: Degree of aggregation is 25% or more and less than 30%.
D: Degree of aggregation is 30% or more and less than 35%.
E: Degree of aggregation is 35% or more.

Fixability

A color laser printer (HP Color LaserJet 3525dn, manufactured by HP Co.) with a fixing unit removed was prepared, toner was taken out from a cyan cartridge, and toner to be evaluated was filled thereinstead. Next, an unfixed toner image (0.9 mg/cm$^2$) of 2.0 cm in length and 15.0 cm in width was formed on image receiving paper (Canon office planner 64 g/m$^2$) by using the filled toner on a portion of 1.0 cm from the upper end with respect to the paper passing direction. Next, the removed fixing unit was modified so that the fixing temperature and process speed could be adjusted, and the fixing test of the unfixed image was performed using the modified fixing unit.

First, under a normal temperature and normal humidity environment (23° C., 60% RH), the process speed was set to 230 mm/s, the fixing line pressure was set to 27.4 kgf, the initial temperature was set to 85° C., the set temperature was gradually raised by 5° C., and the unfixed image was fixed at each temperature.

The evaluation criteria for low-temperature fixability are as follows. The low-temperature side fixing start point is taken as the lowest temperature at which the number of image peelings of 150 μm or more in diameter is 3 or less when the surface of the image is rubbed 5 times at a speed of 0.2 m/sec with Sylbon paper (Dasper K-3) under a load of 4.9 kPa (50 g/cm$^2$). Where fixing is not performed effectively, the number of image peelings tends to increase.

The evaluation criteria are as follows.
A: The low-temperature side fixing start point is 115° C. or less.
B: The low-temperature side fixing start point is 120° C. or higher and lower than 130° C.
C: The low-temperature side fixing start point is 130° C. or higher and lower than 145° C.
D: The low-temperature side fixing start point is 145° C. or higher and less than 160° C.
E: The low-temperature side fixing start point is 160° C. or higher.

Evaluation of Toner Charge Stability

After allowing the developing device with the above cartridge inserted to stand for 24 hours in an environment of high temperature and high humidity (temperature 30° C., humidity 80% RH), the process speed was set to 200 mm/s in a cyan monochromatic mode. An "E" character (image print percentage 1%) was printed out 5000 times in an intermittent printing (stopping for 2 seconds for every 2 sheets printed) mode. Immediately after printing the first sheet (initial stage) and the day after printing the 5000th sheet (after 5k), the fogging density on the drum was measured by the following method.

A printout operation of a solid white image was performed, the cartridge was pulled out at the time of transfer, a colorless transparent tape was adhered to the drum before transfer, and the tape was attached to paper (similar to transfer paper). The density D1 of the tape portion stuck on the paper was measured using a "White Photometer TC-6DS" (manufactured by Tokyo Denshoku Co., Ltd.).

Meanwhile, the tape not adhered to the drum was attached to the paper as it was, and the concentration D0 was measured under the same conditions. The difference in concentration (D1-D0) was taken as the fogging concentration, and the rate of increase in the fogging concentration between the initial stage and after 5k was evaluated. An amber filter was used as the filter.

The rate of increase in fogging concentration (%) is calculated by the following formula.

Rate of increase in fogging concentration (%)=(fogging concentration after 5k−initial fogging concentration)/(initial fogging concentration).

It is known that when a toner having inferior durability (charge stability) is evaluated by this evaluation method, the fogging value on the drum increases.

The evaluation criteria are as follows.
A: The rate of increase in fogging concentration (%) is less than 1.0.
B: The rate of increase in fogging concentration (%) is 1.0 or more and less than 2.0.
C: The rate of increase in fogging concentration (%) is 2.0 or more and less than 3.0.
D: The rate of increase in fogging concentration (%) is 3.0 or more and less than 4.0.
E: The rate of increase in fogging concentration (%) is 4.0 or more.

Toner Cracking and Chipping (Brittleness Evaluation)

The following evaluation was performed as a durability evaluation against cracking and chipping of toner.

That is, the same durability test as above was carried out at a print percentage of 0.0% in a low-temperature and low-humidity environment (temperature 15° C., humidity 10% RH), and a solid image was output every 1000 sheets. Subsequently, streak images based on development defects caused by cracked toner and chipped toner were evaluated according to the following criteria based on the number of generated streaks.

Here, the streak image based on the development defect is determined by observing the toner and a development blade in a cartridge at the time when the streak occurs on the image. The streak is determined to have occurred when it is confirmed that cracked toner or chipped toner is present in the cartridge, and that such toner is fused to the developing blade. The toner and the developing blade were observed using a scanning electron microscope (SEM) at a magnification of 1000 times.

The evaluation criteria are as follows.

A: The number of sheets where streaks have occurred is 20000 or more.

B: The number of sheets where streaks have occurred is 15000 or more and less than 20000.

C: The number of sheets where streaks have occurred is 10000 or more and less than 15000.

D: The number of sheets where streaks have occurred is 5000 or more and less than 10000.

E: The number of sheets where streaks have occurred is less than 5000,

TABLE 4

Toner evaluation result

| Example No. | Toner No. | Resin A | Resin B | Tg of resin A, resin B, and binder resin (°C.) Tg (A) | Tg (B) | Tg (C) | Heat-resistant storage stability D (%) | Rank | Fixability L (°C.) | Rank | Charge stability Fogging (%) | Rank | Brittleness N | Rank |
|---|---|---|---|---|---|---|---|---|---|---|---|---|---|---|
| 1 | 1 | A-1 | B-1 | 65 | 62 | 50 | 5 | A | 100 | A | 0.3 | A | 30000 | A |
| 2 | 2 | A-1 | B-2 | 65 | 63 | 50 | 8 | A | 100 | A | 0.3 | A | 28000 | A |
| 3 | 3 | A-1 | B-3 | 65 | 61 | 50 | 9 | A | 95 | A | 0.1 | A | 32000 | A |
| 4 | 4 | A-1 | B-4 | 65 | 67 | 50 | 6 | A | 105 | A | 0.4 | A | 28000 | A |
| 5 | 5 | A-1 | B-5 | 65 | 63 | 50 | 7 | A | 105 | A | 0.5 | A | 26000 | A |
| 6 | 6 | A-1 | B-6 | 65 | 58 | 50 | 5 | A | 100 | A | 0.4 | A | 26000 | A |
| 7 | 7 | A-1 | B-7 | 65 | 57 | 50 | 18 | A | 105 | A | 0.3 | A | 18000 | B |
| 8 | 8 | A-1 | B-8 | 65 | 64 | 50 | 6 | A | 105 | A | 0.8 | A | 22000 | A |
| 9 | 9 | A-1 | B-9 | 65 | 63 | 50 | 7 | A | 120 | B | 0.8 | A | 21000 | A |
| 10 | 10 | A-1 | B-10 | 65 | 53 | 50 | 6 | A | 105 | A | 0.8 | A | 17000 | B |
| 11 | 11 | A-1 | B-11 | 65 | 72 | 50 | 5 | A | 135 | C | 0.9 | A | 18000 | B |
| 12 | 12 | A-1 | B-12 | 65 | 52 | 50 | 22 | B | 105 | A | 0.9 | A | 12000 | C |
| 13 | 13 | A-2 | B-1 | 84 | 62 | 50 | 8 | A | 105 | A | 0.3 | A | 30000 | A |
| 14 | 14 | A-3 | B-1 | 90 | 62 | 50 | 17 | A | 115 | A | 0.4 | A | 25000 | A |
| 15 | 15 | A-4 | B-1 | 64 | 62 | 50 | 5 | A | 105 | A | 1.5 | B | 23000 | A |
| 16 | 16 | A-5 | B-1 | 64 | 62 | 50 | 6 | A | 100 | A | 1.6 | B | 24000 | A |
| 17 | 17 | A-6 | B-1 | 68 | 62 | 50 | 8 | A | 105 | A | 1.4 | B | 25000 | A |
| 18 | 18 | A-7 | B-1 | 62 | 62 | 50 | 5 | A | 100 | A | 1.3 | B | 10000 | C |
| 19 | 19 | A-8 | B-1 | 61 | 62 | 50 | 6 | A | 105 | A | 1.4 | B | 12000 | C |
| 20 | 20 | A-9 | B-1 | 68 | 62 | 50 | 7 | A | 105 | A | 1.5 | B | 29000 | A |
| 21 | 21 | A-10 | B-1 | 58 | 62 | 50 | 28 | C | 120 | B | 1.6 | B | 18000 | B |
| 22 | 22 | A-11 | B-1 | 55 | 62 | 50 | 26 | C | 120 | B | 1.4 | B | 12000 | C |
| 23 | 23 | A-12 | B-1 | 60 | 62 | 50 | 23 | B | 125 | B | 1.7 | B | 15000 | B |
| 24 | 24 | A-13 | B-1 | 52 | 62 | 50 | 22 | B | 105 | A | 1.3 | B | 19000 | B |
| 25 | 25 | A-14 | B-1 | 68 | 62 | 50 | 27 | C | 135 | C | 1.5 | B | 18000 | B |
| 26 | 26 | A-15 | B-1 | 70 | 62 | 50 | 21 | B | 140 | C | 2.5 | C | 19000 | B |
| 27 | 27 | A-16 | B-1 | 52 | 62 | 50 | 28 | C | 120 | B | 1.3 | B | 13000 | C |
| 28 | 28 | A-17 | B-1 | 58 | 62 | 50 | 29 | C | 120 | B | 2.6 | C | 14000 | C |
| 29 | 29 | A-1 | B-1 | 65 | 62 | 50 | 5 | A | 105 | A | 0.4 | A | 29000 | A |
| 30 | 30 | A-1 | B-1 | 65 | 62 | 50 | 6 | A | 100 | A | 0.3 | A | 28000 | A |
| 31 | 31 | A-1 | B-1 | 65 | 62 | 50 | 5 | A | 105 | A | 0.4 | A | 28000 | A |
| 32 | 32 | A-1 | B-1 | 65 | 62 | 90 | 20 | B | 140 | C | 1.1 | B | 12000 | C |
| C.E. 1 | C. 1 | A-1 | — | 65 | — | 50 | 34 | D | 165 | E | 3.4 | D | 2000 | E |
| C.E. 2 | C. 2 | — | B-4 | — | 67 | 50 | 45 | E | 125 | B | 2.6 | C | 4000 | E |
| C.E. 3 | C. 3 | A-1 | Formula (20) | 68 | — | 50 | 55 | E | 125 | B | 2.4 | C | 4000 | E |
| C.E. 4 | C. 4 | 3-aminopropyl triethoxy silane | B-1 | — | 62 | 50 | 60 | E | 125 | B | 5.9 | E | 3000 | E |
| C.E. 5 | C. 5 | R-1 | B-1 | 57 | 62 | 50 | 50 | E | 120 | B | 3.3 | D | 4000 | E |

In the Table, "C.E." denotes "Comparative Example", "C." denotes "Comparative", "D" denotes "Degree of aggregation (%)", "L" denotes "Low-temperature side fixing start point (°C.)", and "N" denotes "Number of sheets where streaks have occurred".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-178374, filed Oct. 23, 2020, which is hereby incorporated by reference herein in its entirety.

What is claimed is:

1. A toner, comprising:

a toner particle, the toner particle comprising a binder resin, a resin A, and a resin B;

the resin A comprising a structure represented by formula (1)

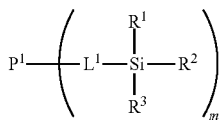

where $P^1$ represents a polyester resin segment, $L^1$ represents a single bond or a divalent linking group, $R^1$ to $R^3$ independently represent a hydrogen atom, an alkyl group having 1 or more carbon atoms, an alkoxy group having 1 or more carbon atoms, a hydroxy group, a halogen atom, and an aryl group having 6 or more carbon atoms, and m represents a positive integer; and the resin B comprises an azo group in a molecule, wherein when m is 2 or more, a plurality of $L^1$, a plurality of $R^1$, a plurality of $R^2$, and a plurality of $R^3$ may be the same or different from each other.

2. The toner according to claim 1, wherein an amount of silicon atoms in the resin A is 0.02 to 10.00% by mass.

3. The toner according to claim 1, wherein at least one of $R^1$ to $R^3$ represents an alkoxy group having one or more carbon atoms, or a hydroxy group.

4. The toner according to claim 1, wherein each of $R^1$ to $R^3$ independently represents an alkoxy group having one or more carbon atoms, or a hydroxy group.

5. The toner according to claim 1, wherein $L^1$ is represented by formula (2)

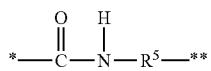

where $R^5$ represents a single bond, an alkylene group or an arylene group, (*) represents a binding site to $P^1$, and (**) represents a binding site to the silicon atom in formula (1).

6. The toner according to claim 1, wherein resin A has a weight average molecular weight of 3000 to 100000.

7. The toner according to claim 1, wherein resin B includes a structure represented by formula (11A) below:

$Ar^{11}$—N=N—$Ar^{21}$ (11A)

where $Ar^{11}$ and $Ar^{21}$ independently represent a substituted or unsubstituted aromatic group, with the proviso that at least one of $Ar^{11}$ and $Ar^{21}$ has a substituent forming a binding segment with an organic resin in resin B.

8. The toner according to claim 1, wherein the resin B includes a structure represented by formula (12A) below:

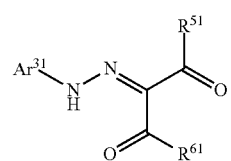

where $R^{51}$ and $R^{61}$ independently represent a substituted or unsubstituted alkyl group, a substituted or unsubstituted phenyl group, an $OR^7$ group or an $NR^8R^9$ group, $R^7$ to $R^9$ each independently represent a hydrogen atom, a substituted or unsubstituted alkyl group, a substituted or unsubstituted phenyl group or an aralkyl group, and $Ar^{31}$ represents a substituted or unsubstituted aryl group, with the proviso that at least one of $R^{51}$, $R^{61}$, and $Ar^{31}$ has a divalent substituent forming a binding segment with an organic resin in resin B.

9. The toner according to claim 1, wherein resin B has a weight average molecular weight of 3000 to 100000.

10. The toner according to claim 1, wherein

Tg(A)>Tg(C)

Tg(B)>Tg(C)

where Tg(A) is stands for a glass transition temperature Tg of resin A, Tg(B) is for a glass transition temperature Tg of resin B, and Tg(C) is a glass transition temperature Tg of binder resin.

11. The toner according to claim 1, wherein the binder resin is a copolymer of styrene and a (meth) acrylic acid alkyl ester with an alkyl group having 1 to 8 carbon atoms, and having a styrene: (meth)acrylic acid alkyl ester copolymerization ratio (mass ratio) of 55:45 to 80:20.

* * * * *